US012620525B2

(12) United States Patent
Okawara et al.

(10) Patent No.: US 12,620,525 B2
(45) Date of Patent: May 5, 2026

(54) MANUFACTURING METHOD FOR PERMANENT MAGNET

(71) Applicant: MINEBEA MITSUMI Inc., Nagano (JP)

(72) Inventors: Yu Okawara, Kitasaku-gun (JP); Haruhiro Komura, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 411 days.

(21) Appl. No.: 18/564,716

(22) PCT Filed: May 16, 2022

(86) PCT No.: PCT/JP2022/020303

§ 371 (c)(1),
(2) Date: Nov. 28, 2023

(87) PCT Pub. No.: WO2022/255065

PCT Pub. Date: Dec. 8, 2022

(65) Prior Publication Data

US 2024/0274354 A1 Aug. 15, 2024

(30) Foreign Application Priority Data

May 31, 2021 (JP) ................................ 2021-090739

(51) Int. Cl.
*H01F 41/02* (2006.01)
*H01F 13/00* (2006.01)

(52) U.S. Cl.
CPC ....... *H01F 41/0253* (2013.01); *H01F 13/003* (2013.01)

(58) Field of Classification Search
CPC .......... H01F 7/02; H01F 13/00; H01F 13/003; H01F 41/02; H01F 41/0253
See application file for complete search history.

(56) References Cited

U.S. PATENT DOCUMENTS 6,708,388 B1 * 3/2004 Yamashita ............. H02K 15/03 310/154.29
7,821,365 B2 * 10/2010 Komura ................ H01F 41/028 335/284

(Continued)

FOREIGN PATENT DOCUMENTS

JP H01-297807 A 11/1989
JP H08-97035 A 4/1996

(Continued)

OTHER PUBLICATIONS

English translation of the Written Opinion for corresponding International Application No. PCT/JP2022/020303 dated Aug. 16, 2022.

(Continued)

*Primary Examiner* — Alexandra M Moore
(74) *Attorney, Agent, or Firm* — Chrisman Gallo Tochtrop LLC

(57) ABSTRACT

A manufacturing method for a permanent magnet includes a magnetization step of magnetizing a to-be-magnetized object by a magnetizer including a field magnet unit having a plurality of permanent magnets for magnetization configured to generate a magnetic field on the to-be-magnetized object arranged at equal intervals and a heating unit having a heating surface opposing the to-be-magnetized object in an axial direction of the to-be-magnetized object and configured to heat the to-be-magnetized object. In the magnetization step, the to-be-magnetized object is disposed on the field magnet unit, the to-be-magnetized object is heated by the heating unit to a temperature equal to or higher than a Curie point of the to-be-magnetized object and lower than the Curie point of the permanent magnets for magnetization, and then the temperature is lowered to a temperature lower than the Curie point of the to-be-magnetized object, and a (Continued)

magnetization magnetic field is applied to the to-be-magnetized object by the permanent magnets for magnetization.

2 Claims, 20 Drawing Sheets

(56) References Cited

U.S. PATENT DOCUMENTS

| | | | | |
|---|---|---|---|---|
| 7,921,547 | B2 * | 4/2011 | Takehara | H02K 15/03 29/596 |
| 9,082,546 | B2 | 7/2015 | Komura et al. | |
| 2008/0122565 | A1 | 5/2008 | Komura et al. | |
| 2010/0308679 | A1 * | 12/2010 | Yamashita | H02K 21/125 310/156.45 |

FOREIGN PATENT DOCUMENTS

| | | |
|---|---|---|
| JP | 2001-157419 A | 6/2001 |
| JP | 2006-203173 A | 8/2006 |
| JP | 2015-012038 A | 1/2015 |
| JP | 2019-102583 A | 6/2019 |
| JP | 2021-093521 A | 6/2021 |

OTHER PUBLICATIONS

International Search Report for corresponding International Application No. PCT/JP2022/020303 mailed Aug. 16, 2022.

Written Opinion for corresponding International Application No. v dated Aug. 16, 2022.

Morita, "Effect of Methods to Improve Coercivity on Temperature Dependence in Nd—Fe—B Magnets", Daido Steel Co., Ltd. Technical Report, Electric Steel Manufacturing, 2011, vol. 82, No., p. 5-10 (cited on p. 1).

* cited by examiner

MANUFACTURING METHOD FOR PERMANENT MAGNET

CROSS REFERENCE TO RELATED APPLICATIONS

This application is a national stage entry of International Application No. PCT/JP 2022/020303 filed on May 16, 2022, which claims benefit of priority from Japanese application no. 2021-090739, filed on May 31, 2021. The entire contents of the above-identified applications are hereby incorporated by reference.

TECHNICAL FIELD

The disclosure relates to a manufacturing method for a permanent magnet.

BACKGROUND

Among rare earth iron-based magnets, in particular, Nd—Fe—B-based sintered magnets have high magnetic characteristics and thus are used in various devices, apparatuses, and motors. However, when the Nd—Fe—B-based sintered magnets are used in a high-temperature environment, a coercive force is decreased due to demagnetization. For this reason, to be used in the high-temperature environment, heat resistance of the Nd—Fe—B based sintered magnets has been awaited. It is typically known that heat resistance is improved by increasing a coercive force of a magnet and that the coercive force is increased by refining the crystal grains of the magnet. A hot-worked magnet capable of making the crystal grain size smaller than a crystal grain size of a sintered magnet is known as an effective means for improving the coercive force by refining the crystal grains of the magnet (see, for example, Toshiyuki Morita, "Effect of Methods to Improve Coercivity on Temperature Dependence in Nd—Fe—B Magnets", Daido Steel Co., Ltd. Technical Report, Electric Steel Manufacturing, 2011, Vol. 82, No. 1, p. 5-10). The crystal grain size of the hot-worked magnet ranges from 1/10 to 1/100 of the crystal grain size of the sintered magnet, allowing for refinement.

Magnetizing the hot-worked magnet is necessary, and a means for pulse-magnetizing a magnet produced by hot working is known (see, for example, JP 01-297807 A). In the manufacturing method for a permanent magnet of JP 01-297807 A, a ribbon-shaped thin strip produced by a quenching method is pulverized into a powder, then a temporary compact is obtained by hot pressing, and the temporary compact is subjected to backward extrusion at a temperature of 700° C. to be plastically deformed, obtaining a magnet material. JP 01-297807 A describes multipolar magnetization of the magnet material with eight poles at a temperature of 50° C. or more and less than the Curie point by using a magnetizer with a coil having a magnetization yoke connected to a pulse power source. According to a manufacturing method of the permanent magnet, the permanent magnet described in JP 01-297807 A is a hot-work magnet described in Toshiyuki Morita, "Effect of Methods to Improve Coercivity on Temperature Dependence in Nd—Fe—B Magnets", Daido Steel Co., Ltd. Technical Report, Electric Steel Manufacturing, 2011, Vol. 82, No. 1, p. 5-10, and the magnetizer is a so-called pulse type magnetizer. JP 01-297807 A describes the fact that when the magnetic characteristics of the permanent magnet magnetized at room temperature were measured, the maximum energy product was 30 MG·Oe and that the coercive force was 12100 (Oe).

SUMMARY

However, the maximum energy product (MG·Oe) of the hot-worked magnet has recently increased, and the coercive force of the hot-worked magnet has been higher than 12100 (Oe). For this reason, the magnetizing method described in JP 01-297807 A, that is, the means of "magnetizing a magnet material at a temperature of 50° C. or more and less than the Curie point by using a magnetizer connected to a pulse power source" may not be able to obtain high magnetization characteristics for a hot-worked magnet having a high coercive force.

In recent years, to reduce a cogging torque of a motor when used in the motor and to improve resolution of a sensor when used as the sensor, multipolar magnetization of the magnet material has been awaited. For winding a coil around a magnetization yoke and applying a pulse current as in JP 01-297807 A, so-called pulse magnetization, narrowing the magnetization pitch causes the number of turns of the coil wound around the magnetization yoke and the diameter of the coil to be limited, failing to increase the magnetization magnetic field and reduce the magnetization pitch.

In view of the above-described problems, an object of the disclosure is to provide a manufacturing method for a permanent magnet to allow for obtaining high magnetization characteristics even by multipolar magnetization on a rare earth iron-based magnet having magnetic anisotropy.

To solve the above-described problems and achieve the above-described object, a manufacturing method for a permanent magnet according to an aspect of the disclosure includes a magnetization step of magnetizing a to-be-magnetized object by a magnetizer including a field magnet unit with a plurality of permanent magnets for magnetization configured to generate a magnetic field on the to-be-magnetized object arranged at equal intervals and a heating unit having a heating surface opposing the to-be-magnetized object in an axial direction of the to-be-magnetized object and configured to heat the to-be-magnetized object. In the magnetization step, the to-be-magnetized object is disposed on the field magnet unit, the to-be-magnetized object is heated by the heating unit to a temperature equal to or higher than a Curie point of the to-be-magnetized object and lower than the Curie point of the permanent magnets for magnetization, and then the temperature is lowered to a temperature lower than the Curie point of the to-be-magnetized object, and a magnetization magnetic field is applied to the to-be-magnetized object by the permanent magnets for magnetization. The to-be-magnetized object is an anisotropic rare earth iron-based magnet having an average crystal grain size of 0.02 μm or more and 3.59 μm or less. In the field magnet unit, the permanent magnets for magnetization are arranged having a pole pitch in the to-be-magnetized object after the magnetization step of 0.3 mm or more and 2.6 mm or less.

An aspect of the disclosure can provide a rare earth iron-based magnet having high magnetization characteristics even by multipolar magnetization on a rare earth iron-based magnet having magnetic anisotropy.

DESCRIPTION OF EMBODIMENTS

Hereinafter, the disclosure will be described more specifically based on examples, but the disclosure is not limited to these examples.

Manufacturing Method of First Embodiment

A manufacturing method for a permanent magnet according to the first embodiment includes a magnetization step of magnetizing a to-be-magnetized object by a magnetizer including a field magnet unit with a plurality of permanent magnets for magnetization configured to generate a magnetic field on the to-be-magnetized object arranged at equal intervals and a heating unit having a heating surface opposing the to-be-magnetized object in an axial direction of the to-be-magnetized object and configured to heat the to-be-magnetized object. In the magnetization step, the to-be-magnetized object is disposed on the field magnet unit, the to-be-magnetized object is heated by the heating unit to increase a temperature equal to or higher than the Curie point of the to-be-magnetized object and lower than the Curie point of the permanent magnets for magnetization and then lower the temperature to a temperature lower than the Curie point of the to-be-magnetized object, and a magnetization magnetic field is applied to the to-be-magnetized object by the permanent magnets for magnetization. The to-be-magnetized object is an anisotropic rare earth iron-based magnet having an average crystal grain size of 0.02 μm or more and 3.59 μm or less. In the field magnet unit, the permanent magnets for magnetization are arranged having a pole pitch in the to-be-magnetized object after the magnetization step of 0.3 mm or more and 2.6 mm or less.

Figure 1:
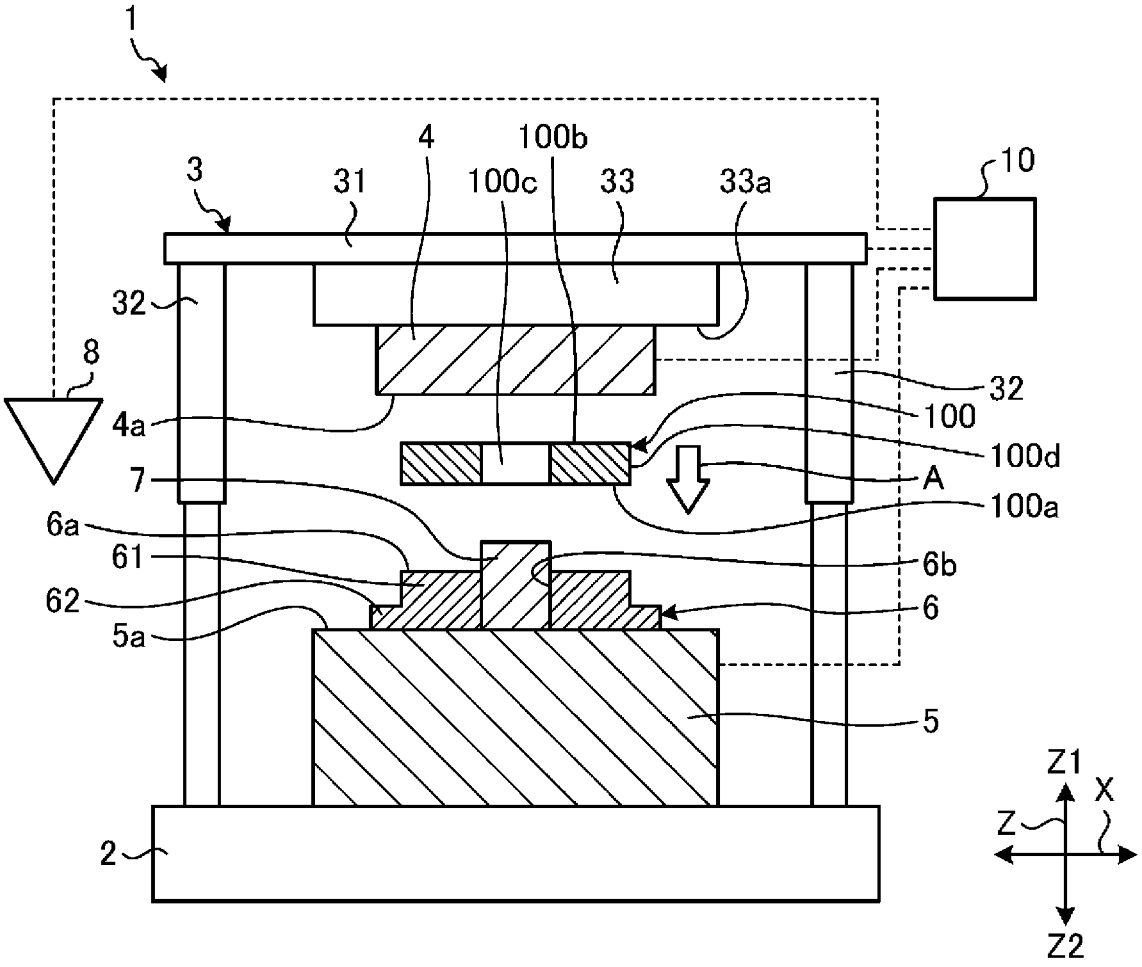
FIG. 1 is a view illustrating a schematic configuration example of a magnetizer used in a first embodiment.
Figure 2:
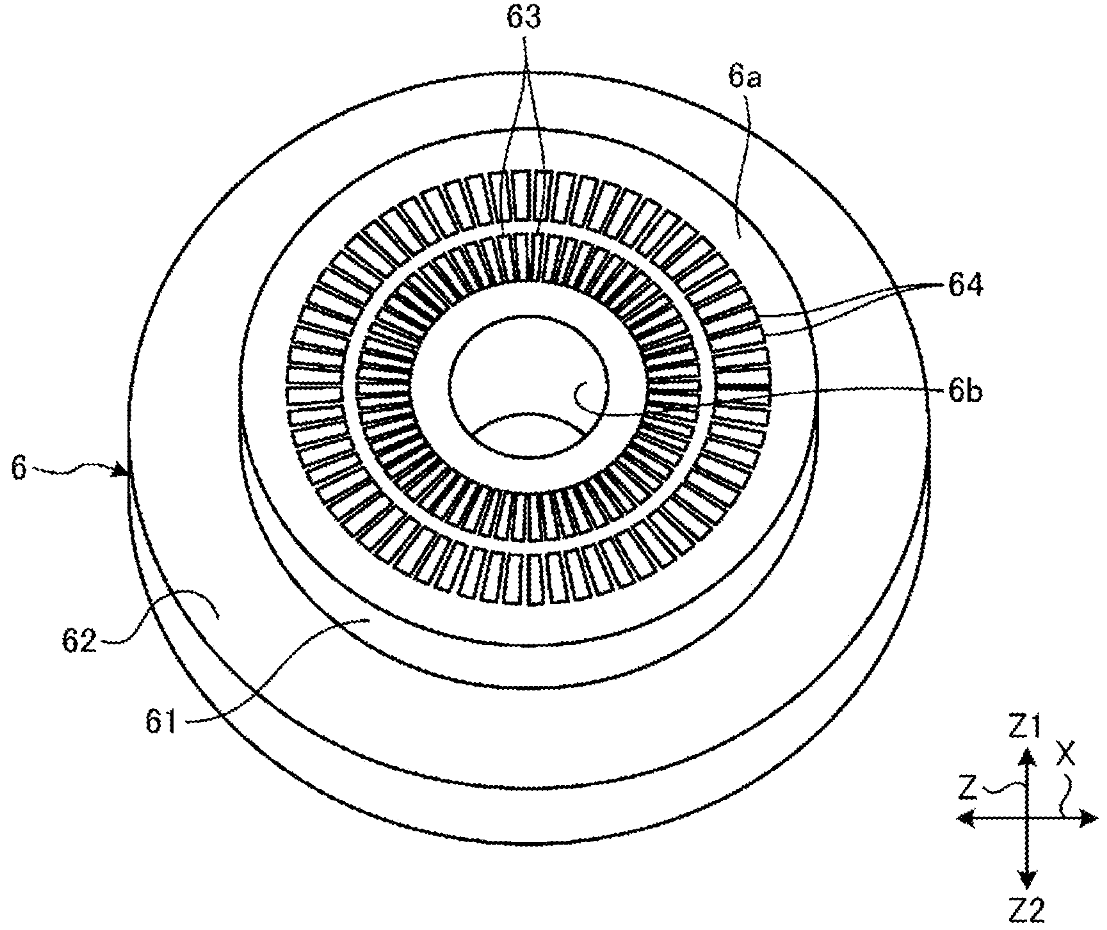
FIG. 2 is a perspective view illustrating a field magnet unit of the magnetizer used in the first embodiment.
Figure 3:
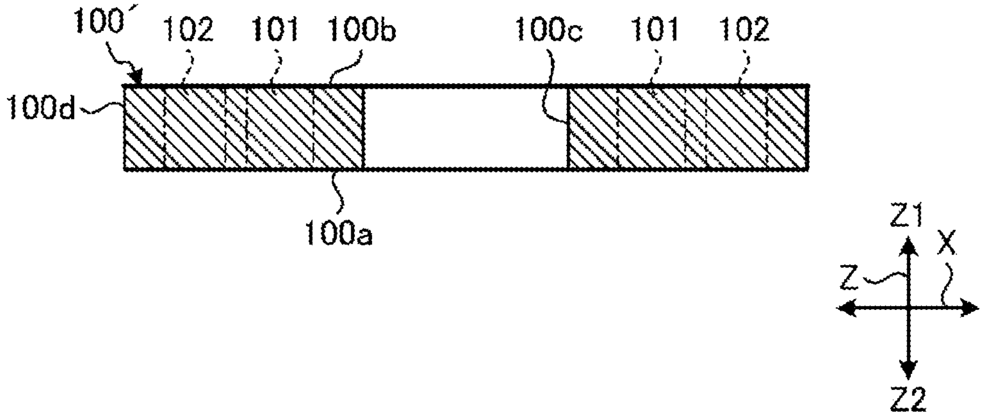
FIG. 3 is a cross-sectional view illustrating a to-be-magnetized object after magnetization.
Figure 4:
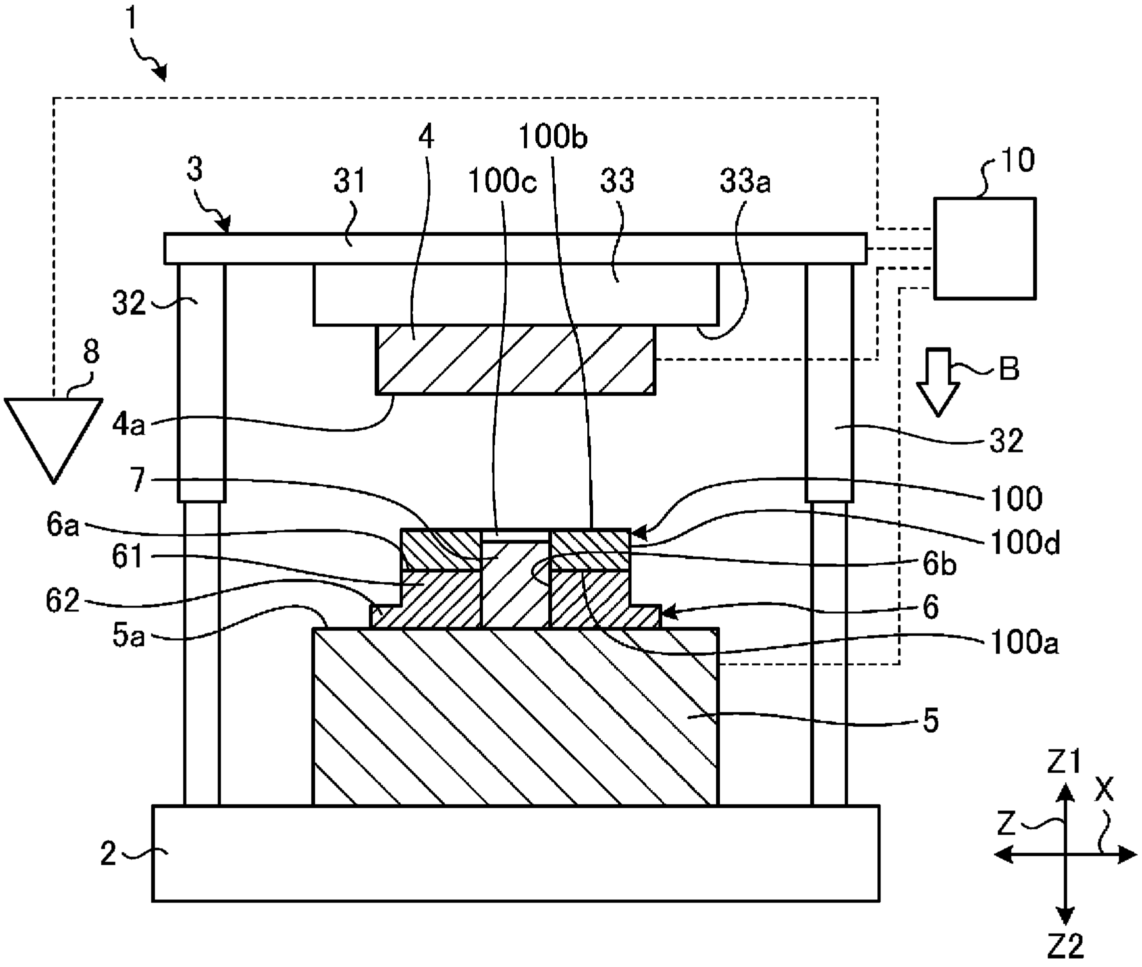
FIG. 4 is an explanatory view of an operation of a magnetizer used in the first embodiment.
Figure 5:
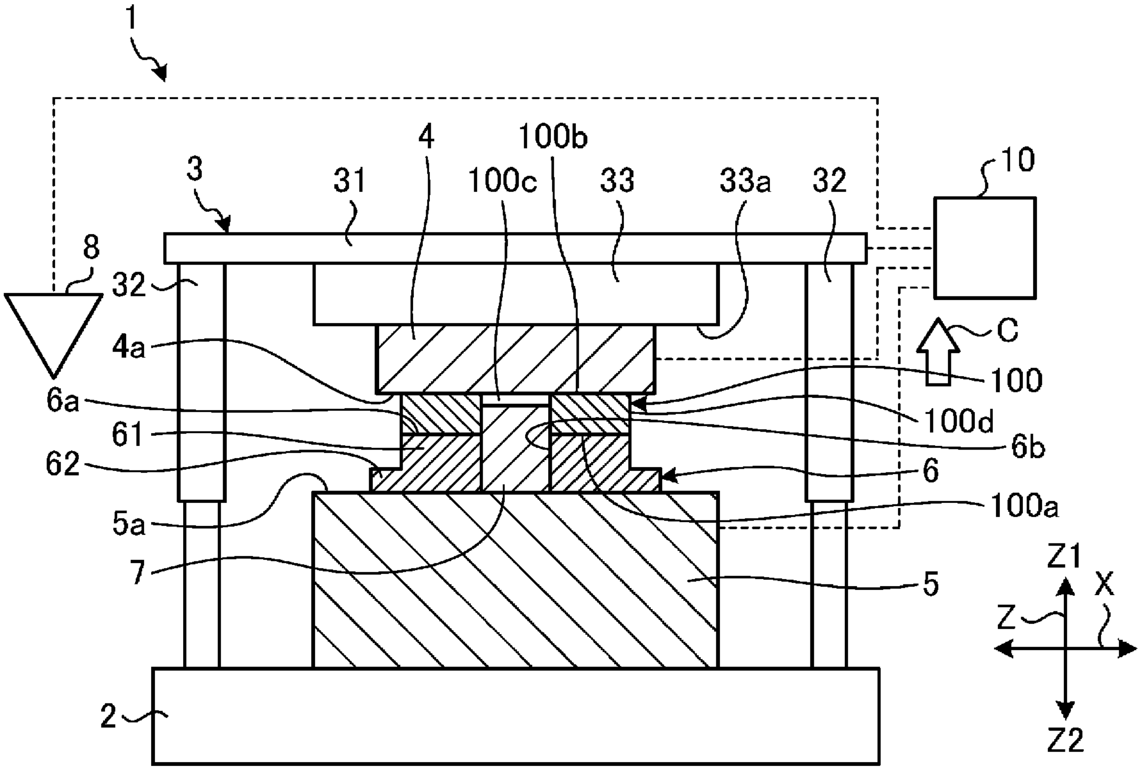
FIG. 5 is an explanatory view of the operation of the magnetizer used in the first embodiment.
Figure 6:
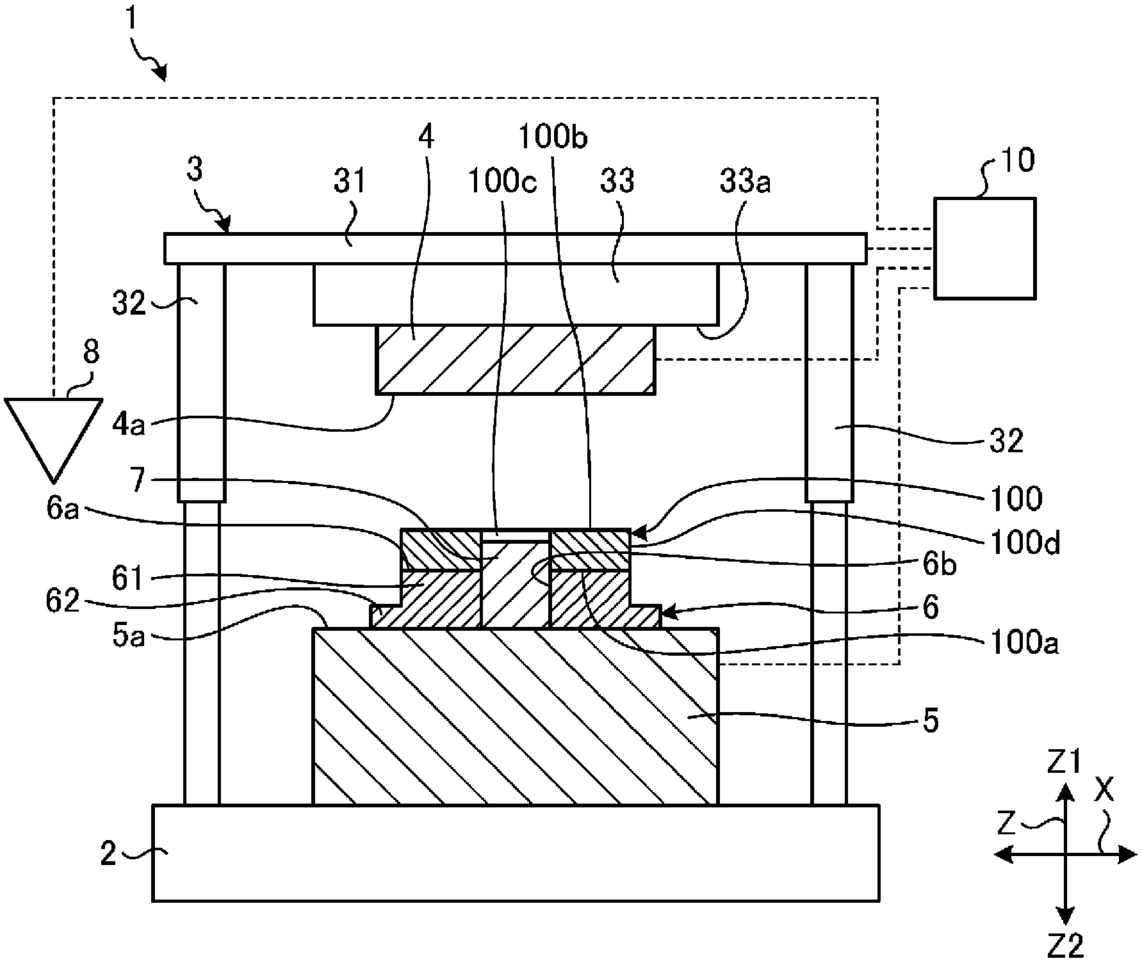
FIG. 6 is an explanatory view of the operation of the magnetizer used in the first embodiment.

In the magnetization step, the to-be-magnetized object is magnetized by a magnetizer. FIG. 1 is a view illustrating a schematic configuration example of a magnetizer used in the first embodiment. FIG. 2 is a perspective view illustrating a field magnet unit of the magnetizer used in the first embodiment. FIG. 3 is a cross-sectional view illustrating a magnetized object after magnetization. FIGS. 4 to 6 are explanatory views of the operation of the magnetizer used in the first embodiment. Further, FIG. 3 is a cross-sectional view of the to-be-magnetized object at a plane including the axial direction. Here, the X direction in each drawing of the present specification is the radial direction of the to-be-magnetized object in the first embodiment. The Z direction is the axial direction of the to-be-magnetized object and is the vertical direction, the Z1 direction is the upward direction, and the Z2 direction is the downward direction.

As illustrated in FIGS. 1 to 3, the magnetizer 1 used in the first embodiment magnetizes a to-be-magnetized object 100 to manufacture a magnetized object after magnetization (magnetized object) 100'. The magnetizer 1 includes a pedestal 2, a movement unit 3, a heating unit 4, a preheating unit 5, a field magnet unit 6, a positioning pin 7, a cooling unit 8, and a control unit 10.

The pedestal 2 is a base portion of the magnetizer 1, and at least the movement unit 3, the heating unit 4, the preheating unit 5, the field magnet unit 6, the positioning pin 7, the cooling unit 8, and the control unit 10 are mounted.

The movement unit 3 moves the to-be-magnetized object 100 and the heating unit 4 with respect to each other between a non-heating position and a heating position in the axial direction. The movement unit 3 according to the first embodiment includes a ceiling plate 31, an actuator 32, and a heating unit mounting base 33. The ceiling plate 31 is disposed to be separated from the pedestal 2 in the axial direction, and the actuator 32 and the heating unit mounting base 33 are fixed. The actuators 32 move the ceiling plate 31 with respect to the pedestal 2 in the axial direction. The actuator 32 is, for example, a linear motion mechanism such as a hydraulic cylinder, and is supplied with electric power from external power not illustrated and driven and controlled by the control unit 10. A plurality of, for example, two or four of the actuators 32, are disposed between the pedestal 2 and the ceiling plate 31. The heating unit 4 is fixed to the heating unit mounting base 33, and the heating unit mounting base 33 is fixed to the lower side surface of the ceiling plate 31.

The heating unit 4 heats the to-be-magnetized object 100 for magnetization. The heating unit 4 is made of a non-magnetic metal material, for example, non-magnetic stainless steel, or the like, and heats the to-be-magnetized object 100 to a temperature equal to or higher than the Curie point of the magnet constituting the to-be-magnetized object 100. The heating unit 4 in the first embodiment is formed in a disc shape, and between both surfaces in the vertical direction, the upper side surface is fixed to the heating unit mounting base 33 of the movement unit 3, and the lower side surface is a heating surface 4*a*. The heating surface 4*a* is formed to have an outer diameter larger than the outer diameter of the to-be-magnetized object 100, and faces a placement surface 6*a* of the field magnet unit 6 to be described below in the axial direction. That is, the heating surface 4*a* faces the to-be-magnetized object 100 placed at the placement surface 6*a* in the axial direction. Furthermore, the heating surface 4*a* comes into contact with the to-be-magnetized object 100 at the heating position. The heating unit 4 includes one or more heaters and is supplied with electric power from external power not illustrated and is temperature-controlled by the control unit 10.

The preheating unit 5 preliminarily heats the to-be-magnetized object 100. The preheating unit 5 is made of a non-magnetic metal material and heats the to-be-magnetized object 100 to a temperature lower than the Curie point (a temperature higher than room temperature) of the magnet constituting the to-be-magnetized object 100 before reaching the heating position. The preheating unit 5 of the first embodiment is formed in a columnar shape, and the field magnet unit 6 and the positioning pin 7 are fixed. Here, the preheating unit 5 heats the to-be-magnetized object 100 placed at the field magnet unit 6 through the field magnet unit 6 and the positioning pin 7. Between both surfaces of the preheating unit 5 in the vertical direction, the lower side surface is fixed to the pedestal 2, and the upper side surface is a placement and heating surface 5*a*. The placement and heating surface 5*a* is formed to be larger than the outer diameter of the field magnet unit 6, and comes into contact with the field magnet unit 6 and the positioning pin 7. The preheating unit 5 is supplied with electric power from external power not illustrated and has one or more heaters and is temperature-controlled by the control unit 10.

The field magnet unit 6 generates a magnetic field for the to-be-magnetized object 100. The field magnet unit 6 of the first embodiment magnetizes the to-be-magnetized object 100 in the axial direction. The field magnet unit 6 includes a main body part 61, a flange part 62, and permanent magnets 63, 64. The main body part 61 is made of a non-magnetic metal material in a cylindrical shape, the lower side surface of both surfaces in the vertical direction is fixed to the placement and heating surface 5*a* of the preheating unit 5, and the upper side surface is the placement surface 6*a* for placing the to-be-magnetized object 100. An insertion hole 6*b* for inserting the positioning pin 7 is formed at the main body part 61. The flange part 62 is formed to protrude radially outward from the lower end part of the main body part 61. The flange part 62 fixes the field magnet unit 6 to the preheating unit 5 by inserting a fixing tool, for example, a fastening screw, into a through hole not illustrated and fixing the fixing tool to the preheating unit 5 with the field magnet unit 6 placed at the placement and heating surface 5*a* of the preheating unit 5. The permanent magnets 63, 64 are embedded at an upper end part of the main body part 61, generate a magnetic field for the to-be-magnetized object 100. The permanent magnets 63, 64 are, for example, a rectangular samarium cobalt magnet (Sm—Co magnet, usually having the Curie temperature of 750° C. or more and 900° C. or less). When viewed in the vertical direction, the permanent magnets 63, 64 are formed concentrically about the center of the main body part 61. The plurality of permanent magnets 63 are arranged at equal intervals in the circumferential direction on the radially inner side, and the plurality of permanent magnets 64 are arranged at equal intervals in the circumferential direction on the radially outer side so as to be separated from the permanent magnets 63 in the radial direction. The permanent magnets 63, 64 have two magnetic poles (an S pole and an N pole) at the upper direction side and the lower direction side, and are embedded in the main body part 61 such that the different magnetic poles alternate in the circumferential direction. Here, the magnetic pole (for example, the S pole) at the upper side of the permanent magnets 63, 64 is different from the magnetic pole (for example, the N pole) on the upper side of the permanent magnets 63, 64 adjacent in the circumferential direction, and the magnetic pole (for example, the N pole) on the lower side is different from the magnetic pole (for example, the S pole) at the lower side of the permanent magnets 63, 64 adjacent in the circumferential direction. The permanent magnets 63, 64 according to the first embodiment are different from each other in the number of embedded magnets and the thickness in the circumferential direction, and are different from each other in the positions disposed in the circumferential direction, that is, the arrangement pitch. Further, although the permanent magnets 63, 64 are embedded in the main body part 61 to be exposed at the placement surface 6*a*, the permanent magnets may be embedded inside the main body part 61 without being exposed at the placement surface 6*a*. To be more specific, in the field magnet unit 6, the permanent magnets for magnetization 63, 64 are arranged having the pole pitch of the to-be-magnetized object after the magnetization step of 0.3 mm or more and 2.6 mm or less, and preferably 0.5 mm or more and 2.6 mm or less.

The positioning pin 7 is inserted into a through hole 100*c* of the to-be-magnetized object 100 described below to determine the position of the to-be-magnetized object 100 with respect to the field magnet unit 6 in the radial direction. The positioning pin 7 is fixed to the preheating unit 5 by being inserted into the insertion hole 6*b* of the field magnet unit 6 while the field magnet unit 6 is fixed to the preheating unit 5.

The cooling unit 8 cools the to-be-magnetized object 100 heated by the heating unit 4. The cooling unit 8 of the first embodiment is fixed to the pedestal 2 by a fixing member not illustrated and outputs air toward the to-be-magnetized object 100 placed at the field magnet unit 6. The cooling unit 8 is, for example, an air cooling fan, a compressor supplying compressed air, or the like, and cools the heated to-be-magnetized object 100 not by natural air cooling but by forced air cooling with high cooling efficiency. The cooling unit 8 is supplied with electric power from external power not illustrated, and air blowing is controlled by the control unit 10.

The control unit 10 controls the magnetizer 1 in order to magnetize the to-be-magnetized object 100. The control unit 10 controls the movement unit 3, the heating unit 4, the preheating unit 5, and the cooling unit 8. The control unit 10 controls driving of the movement unit 3 to move the heating unit 4 with respect to the to-be-magnetized object 100 placed at the field magnet unit 6 to the non-heating position and to the heating position. Here, the non-heating position is a position where the heating surface 4*a* is separated from the to-be-magnetized object 100 in the axial direction, the heating surface 4*a* is not in contact with the to-be-magnetized object 100 in the first embodiment, and the to-be-magnetized object 100 is not heated by the heating unit 4 (see FIG. 4). On the other hand, the heating position is a position where the heating surface 4*a* is close to the to-be-magnetized object 100 in the axial direction, the heating surface 4*a* is in contact with the to-be-magnetized object 100 in the first embodiment, and the to-be-magnetized object 100 is heated by the heating unit 4 (see FIG. 5). The control unit 10 controls the temperature of the heating unit 4 to heat the heating unit 4 to reach a heating temperature equal to or higher than the Curie point of the magnet constituting the to-be-magnetized object 100. Specifically, in the first embodiment, before the heating unit 4 reaches the heating position, the heating unit is heated so that the temperature of the heating unit is higher than the Curie point by 30° C. or more and is equal to or lower than 350° C. The heating temperature is a temperature to allow for suppressing degradation of the magnetic characteristics of the magnet constituting the to-be-magnetized object 100. Here, the control unit 10 controls a pressing force applied to the to-be-magnetized object 100 by the heating unit 4 when the heating surface 4*a* comes into contact with the to-be-magnetized object 100. When the heating surface 4*a* comes into contact with the to-be-magnetized object 100, the control unit 10 controls driving of the movement unit 3 to obtain a pressing force to allow for reducing damage to the to-be-magnetized object 100. This can reduce damage to the to-be-magnetized object 100 and make the contact state of the to-be-magnetized object 100 and the heating unit 4 uniform. The control unit 10 controls the temperature of the preheating unit 5 such that the preheating unit 5 is heated to a preheating temperature lower than the Curie point of the magnet constituting the to-be-magnetized object 100 before the preheating unit reaches the heating position. Specifically, in the first embodiment, the preheating unit 5 is heated to a temperature equal to or lower than the Curie point by 30° C. and equal to or higher than 150° C. That is, a preferable range of a preliminary temperature T is $T<T_c$, and a more preferable range of the preliminary temperature T is $T \leq T_c-30$. In addition, more specifically, the range is 150° $C. \leq T<T_c$, and even more specifically, the range is 150° $C. \leq T \leq T_c-30$. $T_c$ is the Curie point of the magnet constituting the to-be-magnetized object 100. By controlling temperature of the cooling unit 8, the control unit 10 causes the heated to-be-magnetized object 100 to be cooled after the position is changed from the heating position to the non-heating position (see FIG. 6).

Here, the to-be-magnetized object 100 and the magnetized object 100' are formed in a ring shape and have a lower side surface 100*a* and an upper side surface 100*b* as both surfaces in the axial direction, the through hole 100*c*, and an outer circumferential surface 100*d* as illustrated in FIGS. 1 and 3. For example, the to-be-magnetized object 100 is formed in a ring shape having an outer diameter of 10 mm or more, preferably 15 mm or more and 50 mm or less as an example.

The to-be-magnetized object 100 includes an anisotropic rare earth iron-based magnet. The anisotropic rare earth iron-based magnet is preferably an RE-Fe—B-based magnet containing, as a rare earth element (RE), Nd and at least one selected from the group consisting of Sc, Y, La, Ce, Pr, Pm, Sm, Eu, Gd, Tb, Dy, Ho, Er, Tm, Yb, and Lu, and containing 1 at % or more and 12 at % or less of B. Specifically, an Nd—Fe—B-based magnet using an Nd—Fe—B-based alloy having an Nd—Fe—B-based compound (for example, $Nd_2Fe_{14}B$) as a main phase is more preferable. According to such an Nd—Fe—B-based magnet, a permanent magnet having excellent magnetic characteristics can be obtained.

In the Nd—Fe—B-based magnet, a part of iron (Fe) may be substituted with, for example, at least one element selected from Co, Ni, Ga, Cu, Al, Si, Ti, Mn, and Nb. When a part of Fe is substituted by Co, the heat resistance can be improved. In the case where a part of Fe is substituted with the above-mentioned element, the amount of substitution with respect to Fe is preferably less than 50 at %, and more preferably 35 at % or less, from the viewpoint of preventing degradation of magnetic characteristics. When such an anisotropic rare earth iron-based magnet is used, it can be strongly magnetized by the above-described magnetizer 1.

The anisotropic rare earth iron-based magnet has an average crystal grain size of 0.02 μm or more and 3.59 μm or less, and more preferably 0.29 μm or more and less than 3.59 μm.

The anisotropic rare earth iron-based magnet may have magnetic anisotropy, and may be a hot-worked magnet or a sintered magnet. The hot-worked magnet is manufactured, for example, by subjecting polycrystalline powder having a powder particle diameter of several tens of μm to hot working to perform orientation and densification. The sintered magnet is manufactured, for example, by cold-forming and orienting a single crystal powder having a powder particle diameter of several μm in a magnetic field, and increasing the density by sintering.

The Curie point of the to-be-magnetized object 100 (the Curie point of the anisotropic rare earth iron-based magnet) is usually 250° C. or more and 400° C. or less.

In the magnetization step of the first embodiment, the to-be-magnetized object is disposed on the field magnet unit, the to-be-magnetized object is heated by the heating unit to a temperature equal to or higher than the Curie point of the to-be-magnetized object and lower than the Curie point of the permanent magnets for magnetization, and then the temperature is lowered to a temperature lower than the Curie point of the to-be-magnetized object, and a magnetization magnetic field is applied to the to-be-magnetized object by the permanent magnets for magnetization. Hereinafter, the magnetization step will be described more specifically. Further, the magnetizer 1 is at the non-heating position. In addition, the to-be-magnetized object 100 is formed in a ring shape in advance according to the number of objects to be manufactured. First, the control unit 10 starts heating of the heating unit 4 and the preheating unit 5 as illustrated in FIG. 1. Here, the control unit 10 heats the heating unit 4 to the heating temperature and heats the preheating unit 5 to the preheating temperature. Next, an operator moves the to-be-magnetized object 100 downward (indicated by the arrow A in the drawing) having the through-hole 100*c* of the to-be-magnetized object 100 and the positioning pin 7 face each other in the axial direction. This causes the to-be-magnetized object 100 to be placed at the placement surface 6*a* of the field magnet unit 6 as illustrated in FIG. 4. At this time, the operator performs positioning of the to-be-magnetized object 100 with respect to the magnetizer 1 by inserting the upper end part of the positioning pin protruding from the placement surface 6*a* of the field magnet unit 6 into the through hole 100*c* of the to-be-magnetized object 100. Further, the upper side surface 100*b* of the to-be-magnetized object 100 faces the heating surface 4*a* of the heating unit 4 in the axial direction.

Next, after a first predetermined time T1 elapses from the placement of the to-be-magnetized object 100 at the placement surface 6*a*, the control unit 10 causes the movement unit 3 to move the heating unit 4 from the non-heating position to the heating position (indicated by the arrow B in the drawing) with respect to the to-be-magnetized object 100. The first predetermined time T1 is a sufficient time until the temperature of the to-be-magnetized object 100 becomes higher than the room temperature and lower than the Curie point by the heating unit 4 maintaining the heating temperature and the to-be-magnetized object 100 placed at the placement surface 6*a* receiving heat from the preheating unit 5 via the field magnet unit 6. That is, the control unit 10 moves the heating unit 4 to the heating position with respect to the to-be-magnetized object 100 after the heating unit 4 is at the heating temperature and the to-be-magnetized object 100 is preheated at the non-heating position. Then, heating of the preheated to-be-magnetized object 100 is started in a state where the heating surface 4*a* is brought into contact with the to-be-magnetized object 100. Further, when the heating unit 4 is moved from the non-heating position to the heating position with respect to the to-be-magnetized object 100 by the movement unit 3, the control unit 10 ends the heating by the preheating unit 5, that is, turns off the temperature control. Next, the control unit 10 causes the to-be-magnetized object 100 to be heated to the Curie point or higher while the heating surface 4*a* is in contact with the to-be-magnetized object 100 as illustrated in FIG. 5. That is, the to-be-magnetized object 100 is heated to a temperature equal to or higher than the Curie point and lower than the Curie point of the permanent magnets for magnetization. Next, after a second predetermined time T2 elapses from the start of heating of the to-be-magnetized object 100 at the heating position, the control unit 10 causes the movement unit 3 to move the heating unit 4 from the heating position to the non-heating position with respect to the to-be-magnetized object 100 (indicated by the arrow C in the same drawing). Here, the second predetermined time T2 is a sufficient time for the to-be-magnetized object 100 to reach the Curie point or higher.

Next, the control unit 10 causes the cooling unit 8 to cool the to-be-magnetized object 100 at the non-heating position as illustrated in FIG. 6. Next, after a third predetermined time T3 elapses from the start of cooling by the cooling unit 8 at the non-heating position, the control unit 10 ends the cooling by the cooling unit 8. Here, the third predetermined time T3 is a time sufficient for the temperature of the to-be-magnetized object 100 to decrease from a temperature equal to or higher than the Curie point to a temperature lower than the Curie point, preferably to a temperature lower than the Curie point by 50° C., and more preferably to a temperature lower than the Curie point by 50° C. or more.

Next, the operator takes out the magnetized object 100'. When the magnetizer 1 newly magnetizes the to-be-magnetized object 100, the control unit 10 starts heating the preheating unit 5 because the heating unit 4 has already been heated.

As described above, in the manufacturing method according to the first embodiment, the temperature of the to-be-magnetized object 100 is increased from a temperature lower than the Curie point to a temperature equal to or higher than the Curie point (and lower than the Curie point of the permanent magnets for magnetization) and is decreased from the Curie point to a temperature lower than the Curie point while the magnetization magnetic field is being applied by the field magnet unit 6. This magnetizes the to-be-magnetized object 100 and manufactures the magnetized object 100' (permanent magnet) illustrated in FIG. 3 from the to-be-magnetized object 100. The magnetized object 100' is magnetized in regions respectively corresponding to the permanent magnets 63, 64 of the field magnet unit 6. The magnetized object 100' is formed with a magnetized region 101 corresponding to each of the permanent magnets 63 and a magnetized region 102 corresponding to each of the permanent magnets 64, that is, the magnetized object is a ring-shaped permanent magnet magnetized in two rows of multiple poles at least on the lower side surface 100*a*.

According to the manufacturing method of the first embodiment, a permanent magnet having high magnetization characteristics can be obtained even by multipolar magnetization on a rare earth iron-based magnet having magnetic anisotropy. To be specific, the magnetized object 100' obtained by the manufacturing method of the first embodiment has a pole pitch of 0.3 mm or more and 2.6 mm or less, and preferably 0.5 mm or more and 2.6 mm or less. Even in the case of a narrow pole pitch, high magnetization characteristics are exhibited. Here, the pole pitch in the ring-shaped magnetized object 100' is an arc length between adjacent poles at a position actually used for sensing or the like. Note that the position actually used for sensing or the like is usually 2.5 mm or more and 42.5 mm or less from the center of the ring represented by the magnetized object 100'. On the other hand, in the case of producing a magnetized object having the above-mentioned pitch by using the above-mentioned to-be-magnetized object by the conventional pulse magnetization, the magnetization characteristics becomes lower as compared with the manufacturing method of the first embodiment.

Here, in order to heat the to-be-magnetized object 100 in the axial direction by the heating unit 4, that is, in order to set the heating surface 4*a* and the upper side surface 100*b* of the to-be-magnetized object 100 to face each other and to be heated, the upper side surface 100*b* as one of both surfaces of the magnetized object after magnetization 100' in the axial direction has a thicker oxide film in the radial direction, compared with the outer circumferential surface 100*d*. As a result, it can be confirmed that, in the magnetized object after magnetization 100', the amount of Nd is greater and more Nd is segregated in the upper side surface 100*d* than in the outer circumferential surface 100*b*.

In the manufacturing method according to the first embodiment, the heating surface 4*a* of the heating unit 4 is closer to the to-be-magnetized object 100 in the axial direction at the heating position than at the non-heating position, and thus the to-be-magnetized object 100 is heated by the heating unit 4 in the axial direction. Therefore, when the heating unit 4 heats the to-be-magnetized object 100 in the axial direction, i.e., setting the heating surface 4*a* to face the upper side surface 100*b* of the to-be-magnetized object 100 to be heated, uneven heating of the to-be-magnetized object 100 can be suppressed, and irregular heating of the to-be-magnetized object 100 can be suppressed, as compared with the case of the heating unit 4 heating the to-be-magnetized object 100 in the radial direction, i.e., setting the heating surface 4*a* to face the outer circumferential surface 100*d* of the to-be-magnetized object 100 to be heated. In particular, the large to-be-magnetized object 100 has a larger heat capacity than the small to-be-magnetized object 100. Since the small to-be-magnetized object 100 is easily heated and easily cooled, the temperature distribution in the to-be-magnetized object 100 is unlikely to be biased; however, when the to-be-magnetized object is large, for example, has a large diameter, the to-be-magnetized object 100 is likely to be irregularly heated. To suppress the occurrence of irregular heating when the to-be-magnetized object 100 is large, it is possible to further increase the heating temperature or to lengthen the second predetermined time T2; however, degradation of the magnetic characteristics of the magnet constituting the to-be-magnetized object 100 may occur. However, in the manufacturing method of the first embodiment, since the to-be-magnetized object 100 in the axial direction is heated, that is, setting the heating surface 4*a* to face the upper side surface 100*b* of the to-be-magnetized object 100 to be heated even if the to-be-magnetized object 100 is large, irregular heating of the to-be-magnetized object 100 can be suppressed even if the heating temperature is not high and the second predetermined time T2 is not long. As a result, it is possible to suppress the temperature of the to-be-magnetized object 100 from being non-uniform while a magnetization magnetic field is applied by the field magnet unit 6, and thus uniformity of magnetization characteristics of the to-be-magnetized object 100 can be achieved.

Manufacturing Method of Second Embodiment

A manufacturing method for a permanent magnet according to the second embodiment includes a magnetization step of magnetizing a to-be-magnetized object by a magnetizer including a field magnet unit with a plurality of permanent magnets for magnetization configured to generate a magnetic field on the to-be-magnetized object arranged at equal intervals and a heating unit having a heating surface opposing the to-be-magnetized object in an axial direction of the to-be-magnetized object and configured to heat the to-be-magnetized object. In the magnetization step, the to-be-magnetized object is disposed on the field magnet unit, the to-be-magnetized object is heated by the heating unit to a temperature equal to or higher than the Curie point of the to-be-magnetized object and lower than the Curie point of the permanent magnets for magnetization, and then the temperature is lowered to a temperature lower than the Curie point of the to-be-magnetized object, and a magnetization magnetic field is applied to the to-be-magnetized object by the permanent magnets for magnetization. The to-be-magnetized object is an anisotropic rare earth iron-based magnet obtained by hot working. In the field magnet unit, the permanent magnets for magnetization are arranged having a pole pitch in the to-be-magnetized object after the magnetization step of 0.3 mm or more and 3.1 mm or less.

Hereinafter, differences between the manufacturing method of the second embodiment and the manufacturing method of the first embodiment will be described, and description of the same points will be omitted or simplified. The magnetizer used in the manufacturing method of the second embodiment is different from the magnetizer 1 used in the first embodiment in the field magnet unit. In the field magnet unit used in the second embodiment, the permanent magnets for magnetization (to be specific, the permanent magnets 63, 64) are arranged having the pole pitch in the to-be-magnetized object after the magnetization step of 0.3 mm or more and 3.1 mm or less, and preferably 0.5 mm or more and 3.1 mm or less.

In the second embodiment, the anisotropic rare earth iron-based magnet contained in the to-be-magnetized object has magnetic anisotropy and is obtained by hot working. The hot-worked magnet is manufactured, for example, by subjecting polycrystalline powder having a powder particle diameter of several tens of μm to hot working to perform orientation and densification. The anisotropic rare earth iron-based magnet used in the second embodiment preferably has an average crystal grain size of 0.02 μm or more and 0.5 μm or less. The Curie point of the to-be-magnetized object (the Curie point of the anisotropic rare earth iron-based magnet) is usually 250° C. or more and 400° C. or less.

According to the manufacturing method of the second embodiment as well, a permanent magnet having high magnetization characteristics can be obtained even by multipolar magnetization on a rare earth iron-based magnet having magnetic anisotropy. To be specific, the magnetized object obtained by the manufacturing method of the second embodiment has a pole pitch of 0.3 mm or more and 3.1 mm or less, and preferably 0.5 mm or more and 3.1 mm or less. Even in the case of a narrow pole pitch, high magnetization characteristics are exhibited. Here, the pole pitch in the ring-shaped magnetized object is an arc length between adjacent poles at a position actually used for sensing or the like. On the other hand, in the case of producing a magnetized object having the above-mentioned pitch by using the above-mentioned to-be-magnetized object by the conventional pulse magnetization, the magnetization characteristics becomes lower as compared with the manufacturing method of the second embodiment.

First Modification

Figure 7:
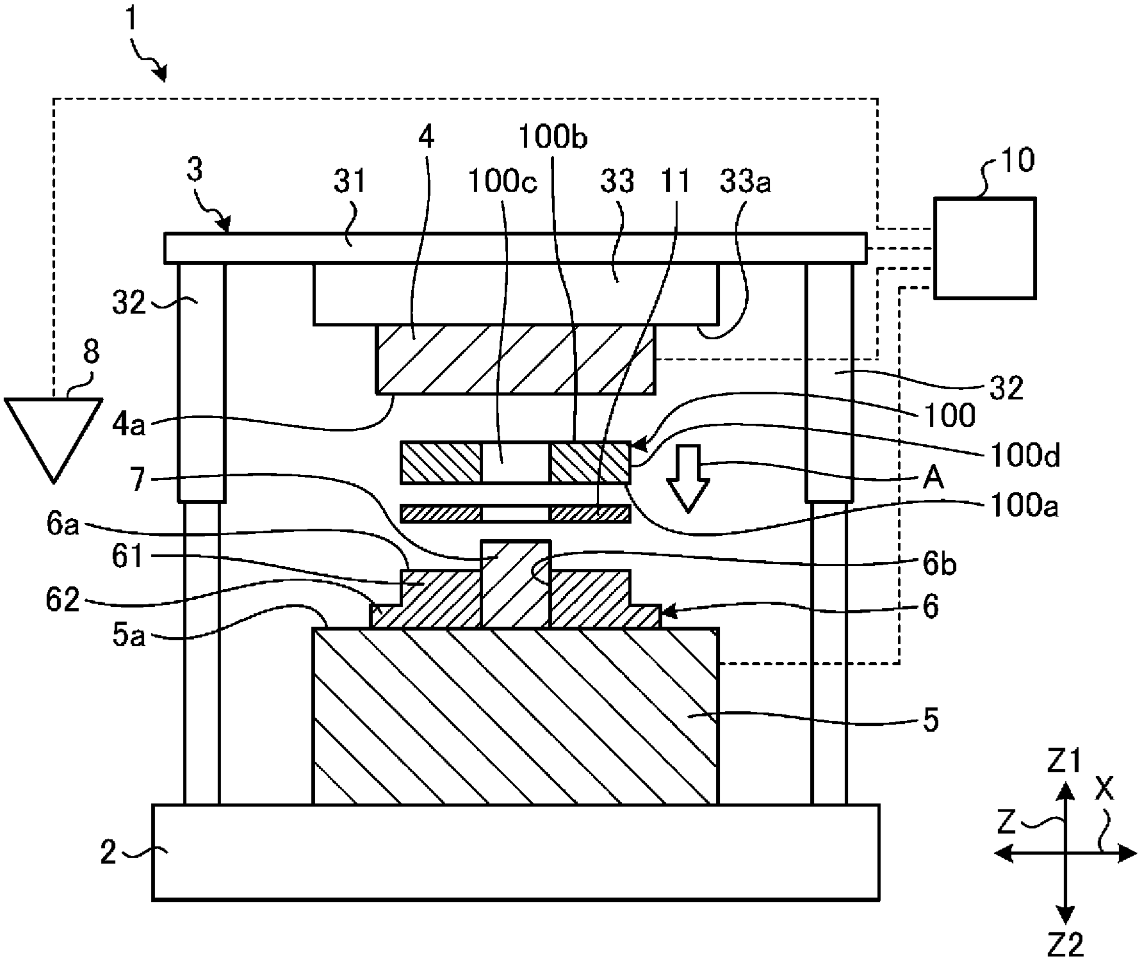
FIG. 7 is a view illustrating a schematic configuration example of a magnetizer used in a first modification.
Figure 8:
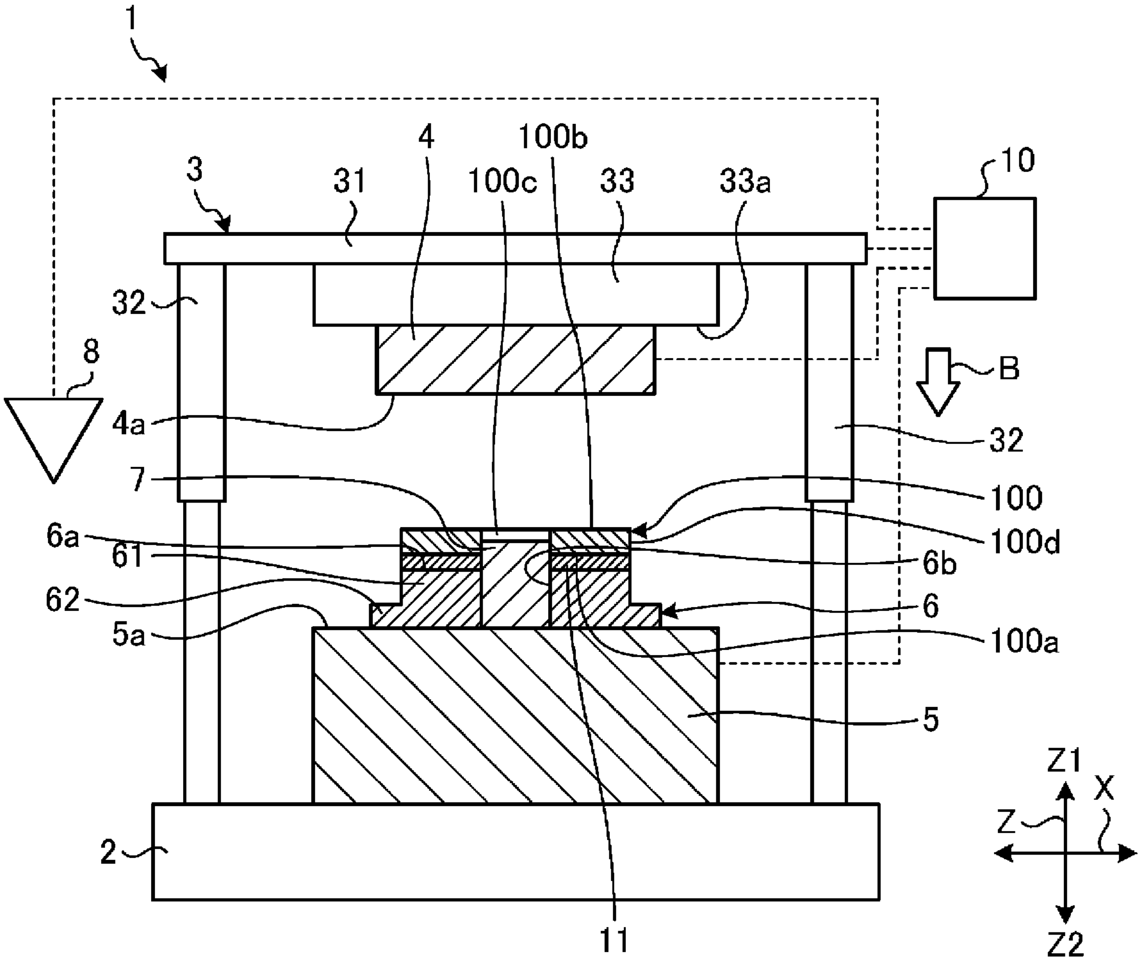
FIG. 8 is an explanatory view of an operation of the magnetizer used in the first modification.
Figure 9:
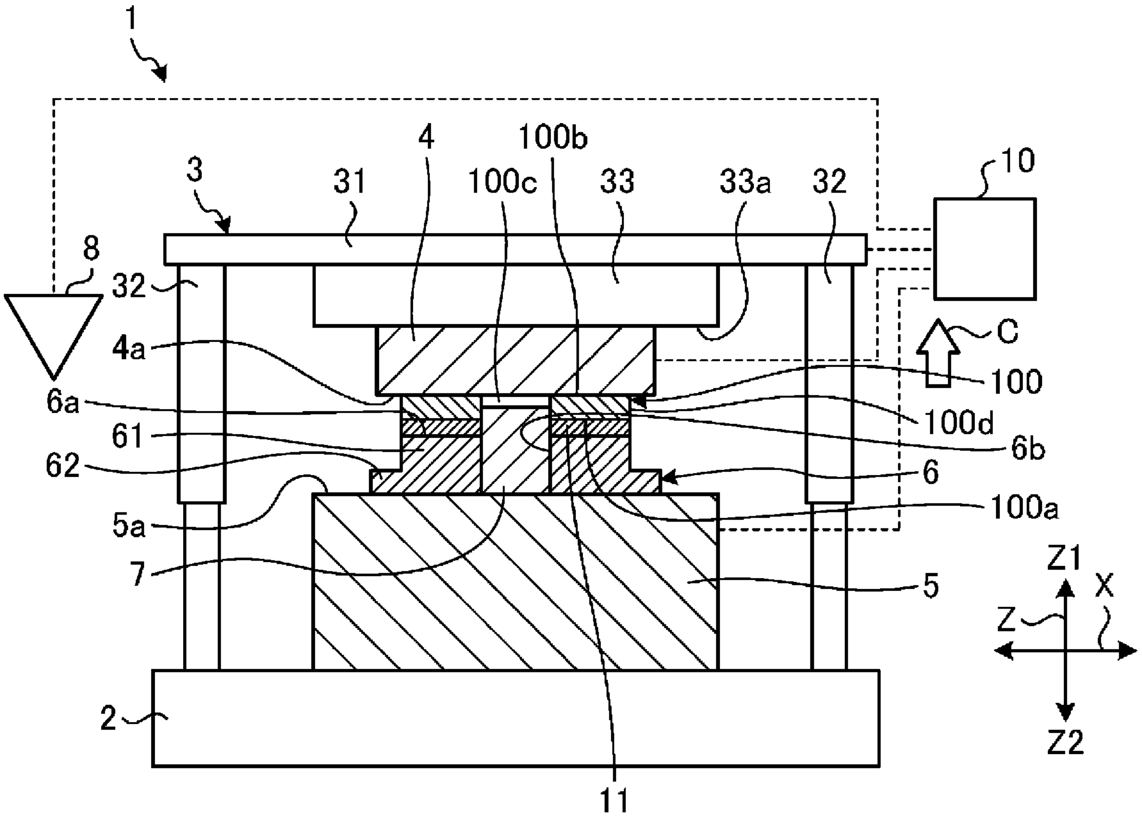
FIG. 9 is an explanatory view of the operation of the magnetizer used in the first modification.
Figure 10:
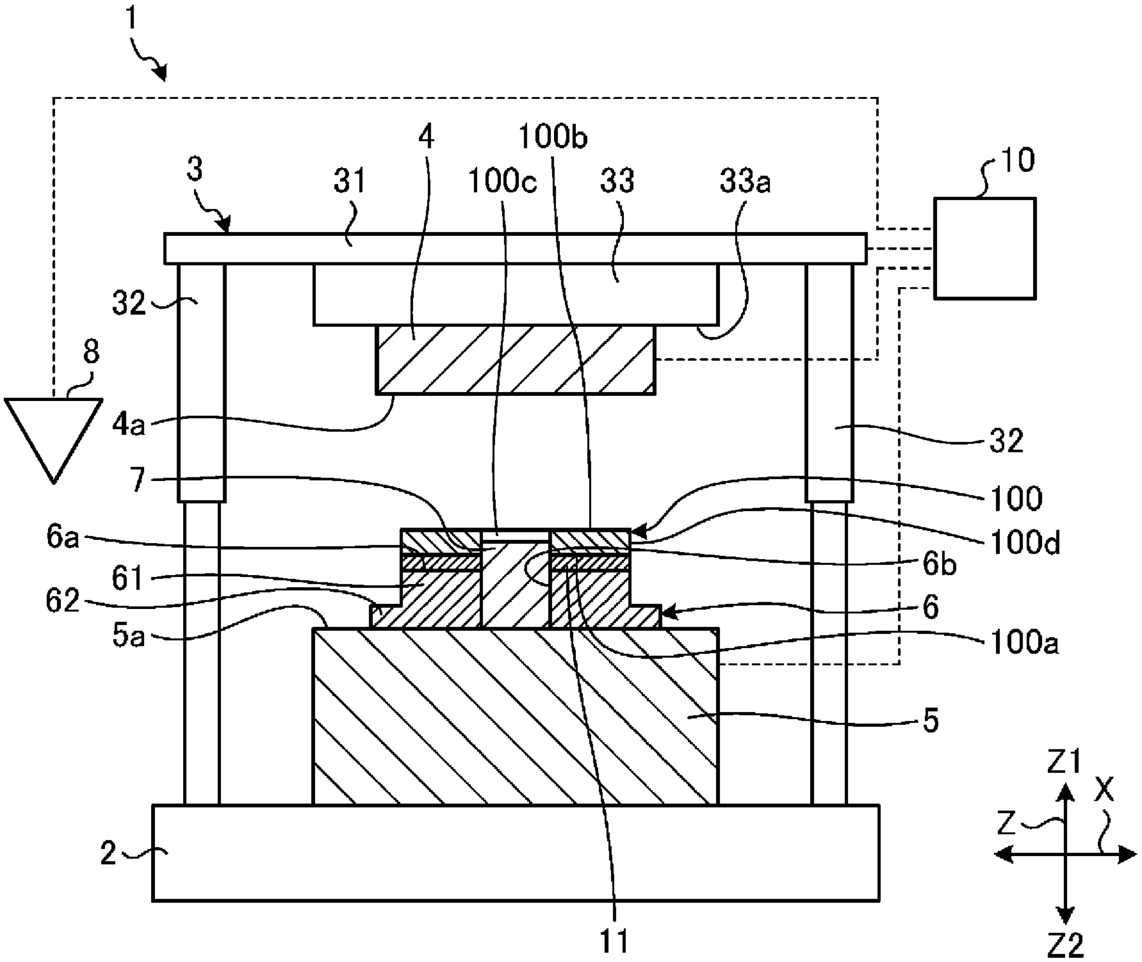
FIG. 10 is an explanatory view of the operation of the magnetizer used in the first modification.

In the manufacturing methods of the first and second embodiments, the magnetizer may be changed to the following magnetizer. FIG. 7 is a view illustrating a schematic configuration example of a magnetizer used in the first modification. FIGS. 8 to 10 are explanatory views of the operation of the magnetizer used in the first modification. Here, the X direction in each drawing of the present specification is the radial direction of the to-be-magnetized object in the first modification. The Z direction is the axial direction of the to-be-magnetized object and is the vertical direction, the Z1 direction is the upward direction, and the Z2 direction is the downward direction.

The magnetizer 1 used in the first modification is different from the magnetizer 1 used in the first and second embodiments in that a spacer 11 made of a non-magnetic material is placed at the field magnet unit 6, and the spacer 11 is interposed between the field magnet unit 6 and the to-be-magnetized object 100. In addition, another difference is that the to-be-magnetized object 100 is magnetized by the field magnet unit 6 via the spacer 11. Note that the basic configuration of the magnetizer 1 used in the first modification is the same as the basic configuration of the magnetizer 1 used in the first and second embodiments, and therefore the configurations denoted by the same reference numerals will be omitted or simplified in the description.

The spacer 11 is a member placed at the placement surface **6*a* of the field magnet unit 6 and interposed between the field magnet unit 6 and the to-be-magnetized object 100. The spacer 11 is formed of, for example, a non-magnetic metal material in a ring shape. Examples of the material to be able to being made thin with a non-magnetic metal material include non-magnetic stainless steel, a titanium alloy, and brass, and the spacer 11** is preferably made of these materials. Further, the material is not limited to a non-magnetic metal material as long as it has heat resistance at 350° C. or higher because it is heated. For example, non-magnetic ceramics may be used.

The outer diameter of the spacer 11 is the same as the placement surface **6*a* of the field magnet unit 6. In addition, the spacer 11 is preferably formed to be 0.7 mm or less thick in the axial direction, and more preferably 0.3 mm or less thick in the axial direction. When the spacer has a thickness greater than 0.7 mm, magnetization of the to-be-magnetized object may be difficult. By interposing the spacer 11 made of non-magnetic metal material between the field magnet unit 6 and the to-be-magnetized object 100, the attraction force between the magnetized object 100' and the field magnet unit 6 can be reduced after the to-be-magnetized object 100 is magnetized. As a result, the to-be-magnetized object 100' can be easily removed from the field magnet unit 6. Furthermore, when the to-be-magnetized object 100' is removed from the field magnet unit 6, it is possible to prevent a part of the to-be-magnetized object 100' from being chipped and to prevent the edge of the to-be-magnetized object 100' from damaging the Sm—Co magnets as permanent magnets exposed at the placement surface 6***a* of the field magnet unit 6.

Next, a magnetization step performed by the magnetizer 1 according to the first modification will be described. Further, the magnetizer 1 is at the non-heating position. First, the control unit 10 starts heating of the heating unit 4 and the preheating unit 5 as illustrated in FIG. 8. Here, the control unit 10 heats the heating unit 4 to the heating temperature and heats the preheating unit 5 to the preheating temperature. Next, an operator moves the to-be-magnetized object 100 downward (indicated by the arrow A in the drawing) having the through-hole 100*c* of the to-be-magnetized object 100 and the positioning pin 7 face each other in the axial direction. As illustrated in FIG. 8, this causes the to-be-magnetized object 100 to be placed at the spacer 11 inserted into the positioning pin 7 and placed at the placement surface 6*a* of the field magnet unit 6. At this time, the operator performs positioning of the to-be-magnetized object 100 with respect to the magnetizer 1 by inserting the upper end part of the positioning pin protruding from the placement surface 6*a* of the field magnet unit 6 and the spacer 11 into the through hole 100*c* of the to-be-magnetized object 100.

Next, after a first predetermined time T1 elapses from the placement of the to-be-magnetized object 100 at the spacer 11 at the placement surface 6*a*, the control unit 10 causes the movement unit 3 to move the heating unit 4 from the non-heating position to the heating position (indicated by the arrow B in the drawing) with respect to the to-be-magnetized object 100. Here, the first predetermined time T1 is a sufficient time for the to-be-magnetized object 100 placed at the spacer 11 to receive heat from the preheating unit 5 via the field magnet unit 6 and the spacer 11 and thus the to-be-magnetized object 100 can reach a temperature higher than room temperature and lower than the Curie point while the heating unit 4 maintains the heating temperature. That is, the control unit 10 moves the heating unit 4 to the heating position with respect to the to-be-magnetized object 100 after the heating unit 4 is at the heating temperature and the to-be-magnetized object 100 is preheated at the non-heating position. Then, heating of the preheated to-be-magnetized object 100 is started in a state where the heating surface 4*a* is brought into contact with the to-be-magnetized object 100. Further, when the heating unit 4 is moved from the non-heating position to the heating position with respect to the to-be-magnetized object 100 by the movement unit 3, the control unit 10 ends the heating by the preheating unit 5, that is, turns off the temperature control. Next, the control unit 10 causes the to-be-magnetized object 100 to be heated to the Curie point or higher while the heating surface 4*a* is in contact with the to-be-magnetized object 100 as illustrated in FIG. 9. That is, the to-be-magnetized object 100 is heated to a temperature equal to or higher than the Curie point and lower than the Curie point of the permanent magnets for magnetization. Next, after a second predetermined time T2 elapses from the start of heating of the to-be-magnetized object 100 at the heating position, the control unit 10 causes the movement unit 3 to move the heating unit 4 from the heating position to the non-heating position with respect to the to-be-magnetized object 100 (indicated by the arrow C in the same drawing). Here, the second predetermined time T2 is a sufficient time for the to-be-magnetized object 100 to reach the Curie point or higher.

Next, the control unit 10 causes the cooling unit 8 to cool the to-be-magnetized object 100 at the non-heating position as illustrated in FIG. 10. Next, after a third predetermined time T3 elapses from the start of cooling by the cooling unit 8 at the non-heating position, the control unit 10 ends the cooling by the cooling unit 8. Here, the third predetermined time T3 is a sufficient time for the to-be-magnetized object 100 to go from the Curie point or higher to a temperature lower than the Curie point; preferably, a temperature lower than the Curie point by 50° C.

Next, the operator takes out the magnetized object 100'. As described above, since the spacer 11 is interposed between the field magnet unit 6 and the magnetized object 100', the magnetized object 100' can be easily removed from the field magnet unit 6. Furthermore, it is possible to prevent a part of the magnetized object 100' from being chipped and to prevent the Sm—Co magnets as permanent magnets exposed at the placement surface 6*a* of the mounting surface of the field magnet unit 6 from being damaged.

According to the manufacturing method of the first modification, as in the first and second embodiments, a permanent magnet having high magnetization characteristics can be obtained even by multipolar magnetization on a rare earth iron-based magnet having magnetic anisotropy. To be specific, when the same to-be-magnetized object as in the first embodiment is used, the pole pitch of the obtained magnetized object is 0.3 mm or more and 2.6 mm or less, and preferably 0.5 mm or more and 2.6 mm or less. In this case, in the field magnet unit, the permanent magnets for magnetization are arranged having the pole pitch of the to-be-magnetized object after the magnetization step falling within the above range. Alternatively, when the same to-be-magnetized object as in the second embodiment is used, the obtained magnetized object has a pole pitch of 0.3 mm or more and 3.1 mm or less, and preferably 0.5 mm or more and 3.1 mm or less. Also in this case, in the field magnet unit, the permanent magnets for magnetization are arranged having the pole pitch of the to-be-magnetized object after the magnetization step falling within the above range.

Second Modification

Figure 11:
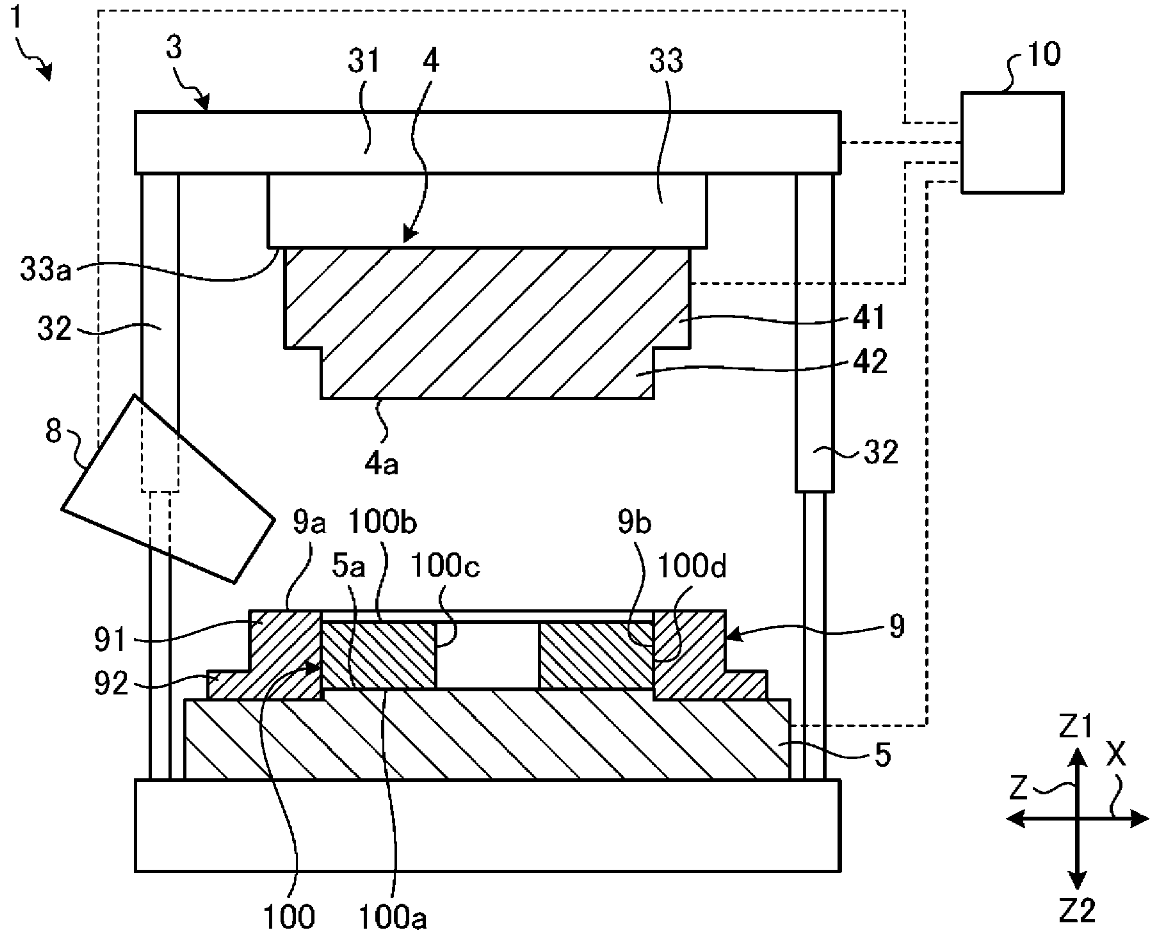
FIG. 11 is a view illustrating a schematic configuration example of a magnetizer used in a second modification.
Figure 12:
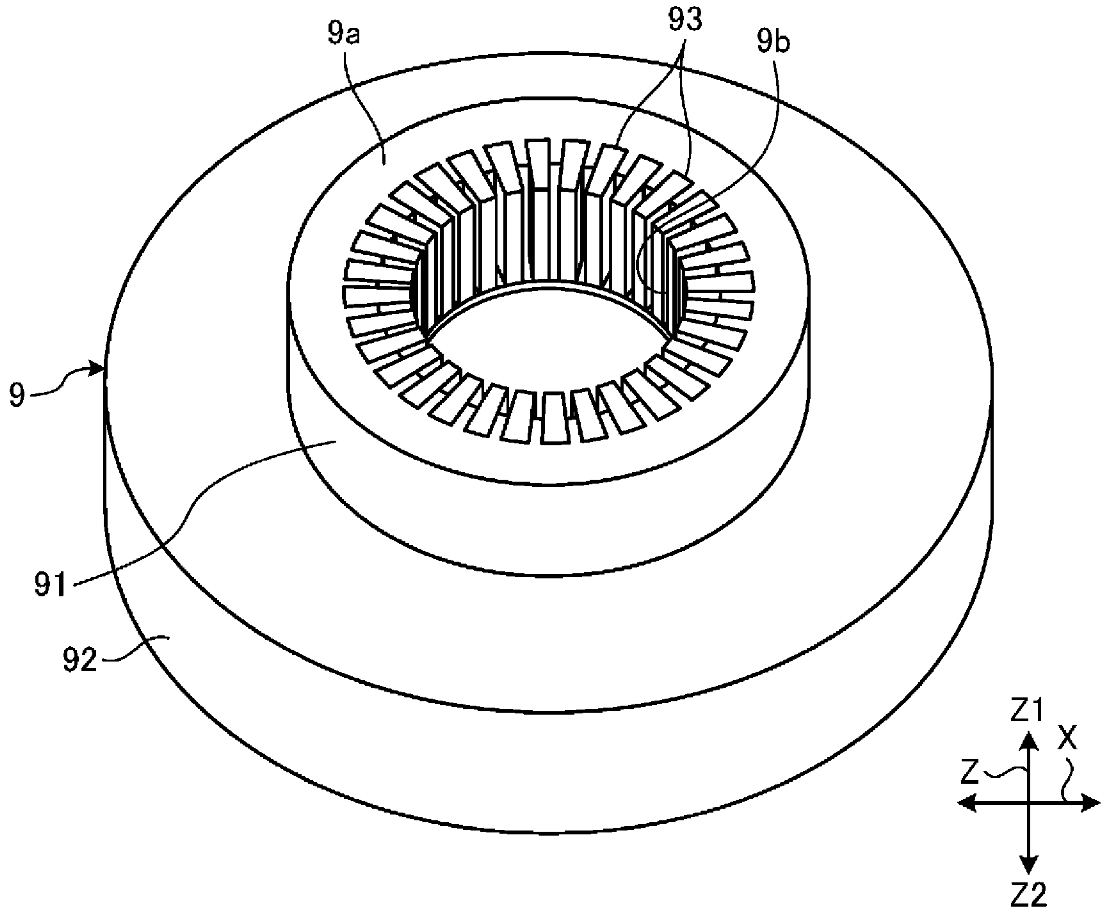
FIG. 12 is a perspective view illustrating a field magnet unit of the magnetizer used in the second modification.
Figure 13:
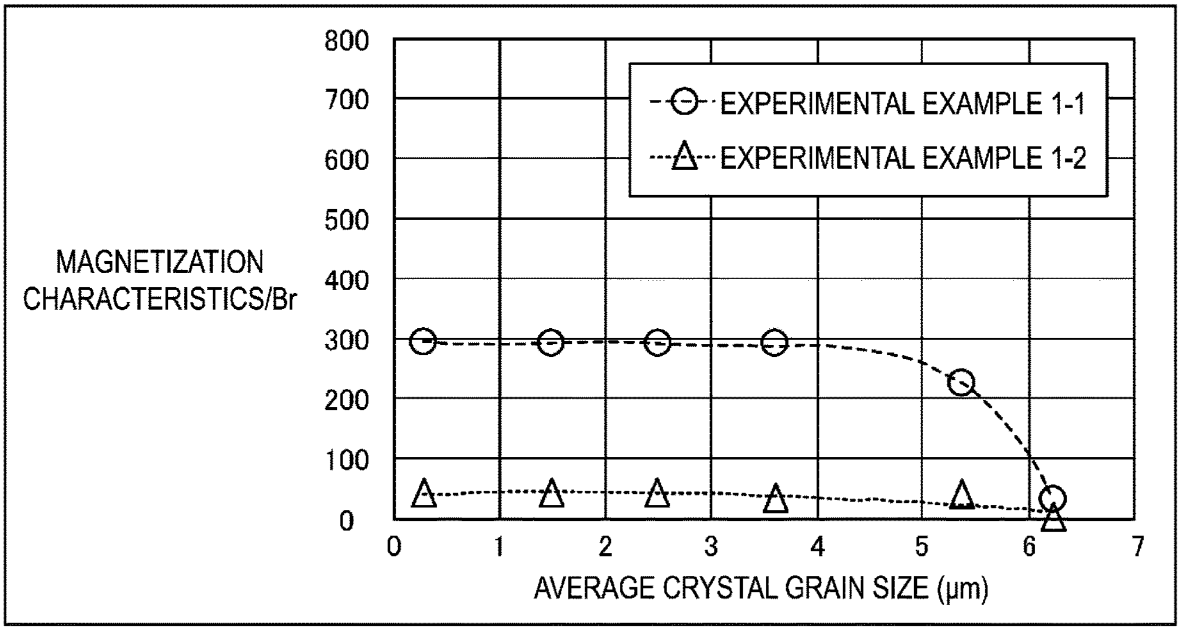
FIG. 13 is a graph illustrating a calculated magnetization index with respect to an average crystal grain size when a pole pitch is 0.5 mm.
Figure 14:
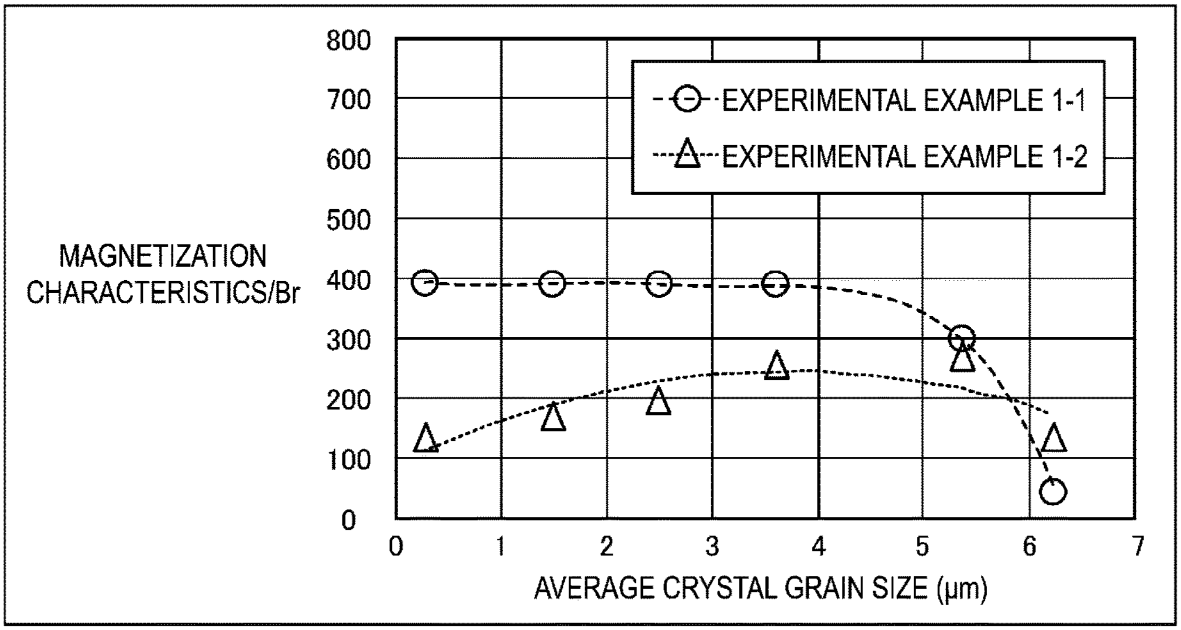
FIG. 14 is a graph illustrating the calculated value of the magnetization index with respect to the average crystal grain size when the pole pitch is 0.8 mm.
Figure 15:
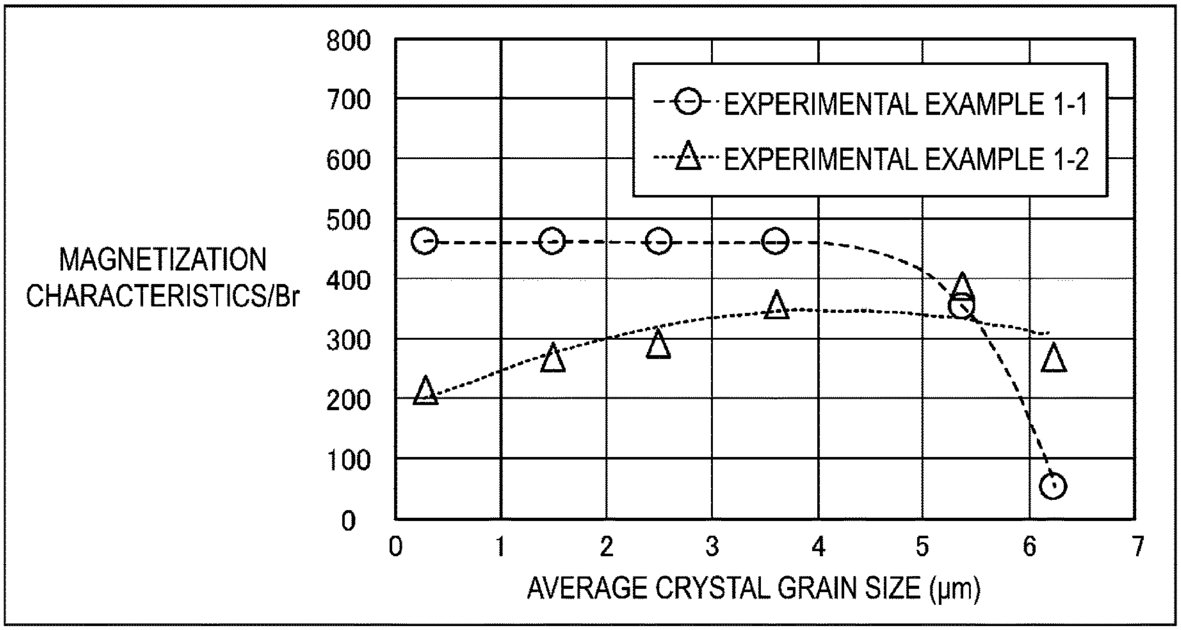
FIG. 15 is a graph illustrating the calculated value of the magnetization index with respect to the average crystal grain size when the pole pitch is 1.0 mm.
Figure 16:
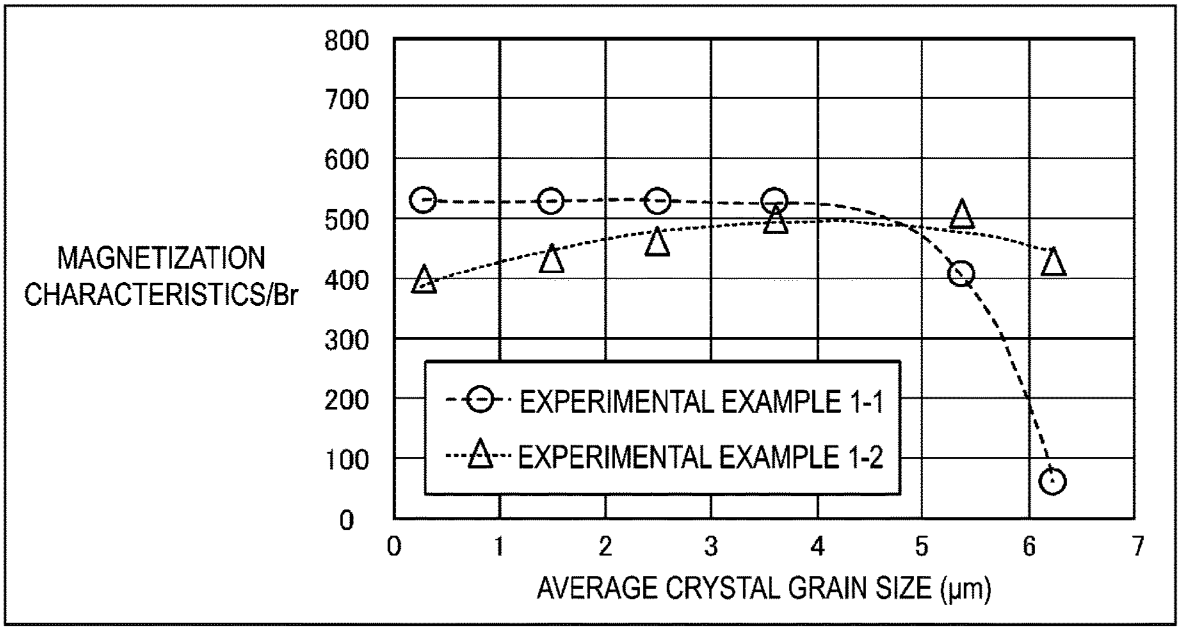
FIG. 16 is a graph illustrating the calculated value of the magnetization index with respect to the average crystal grain size when the pole pitch is 1.6 mm.
Figure 17:
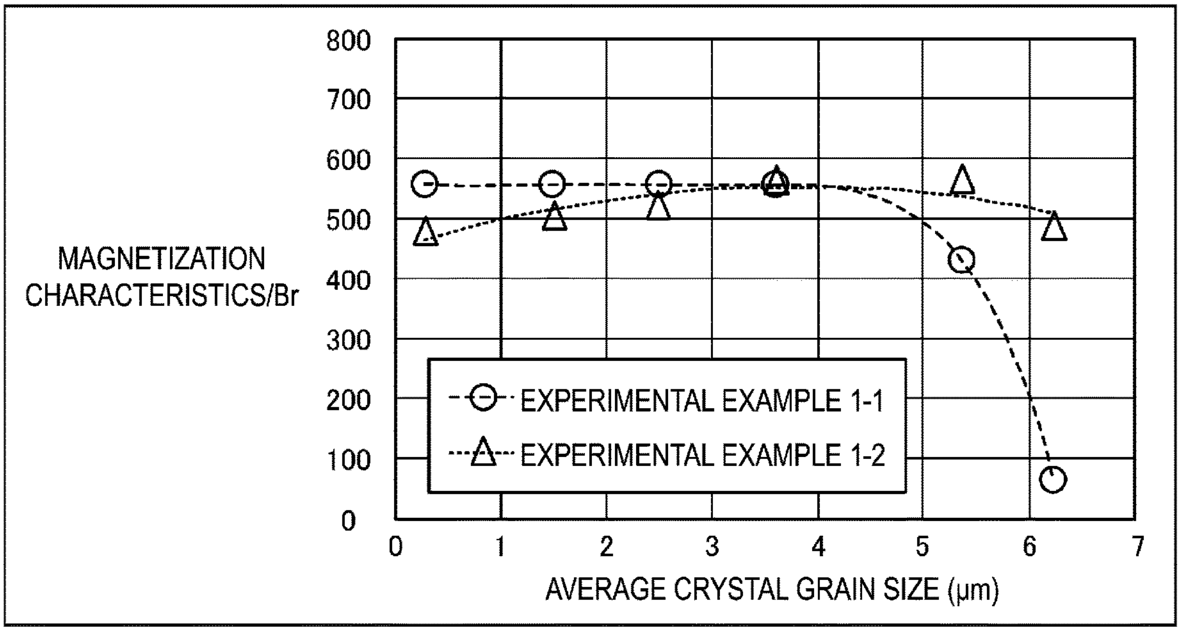
FIG. 17 is a graph illustrating the calculated value of the magnetization index with respect to the average crystal grain size when the pole pitch is 2.0 mm.
Figure 18:
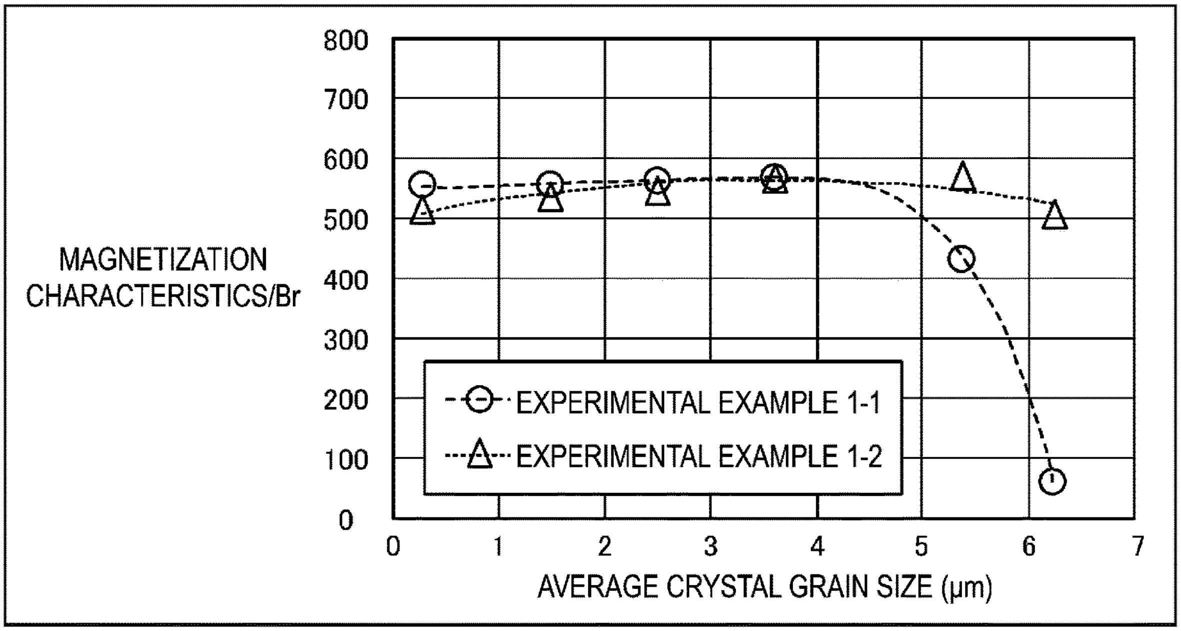
FIG. 18 is a graph illustrating the calculated value of the magnetization index with respect to the average crystal grain size when the pole pitch is 2.6 mm.
Figure 19:
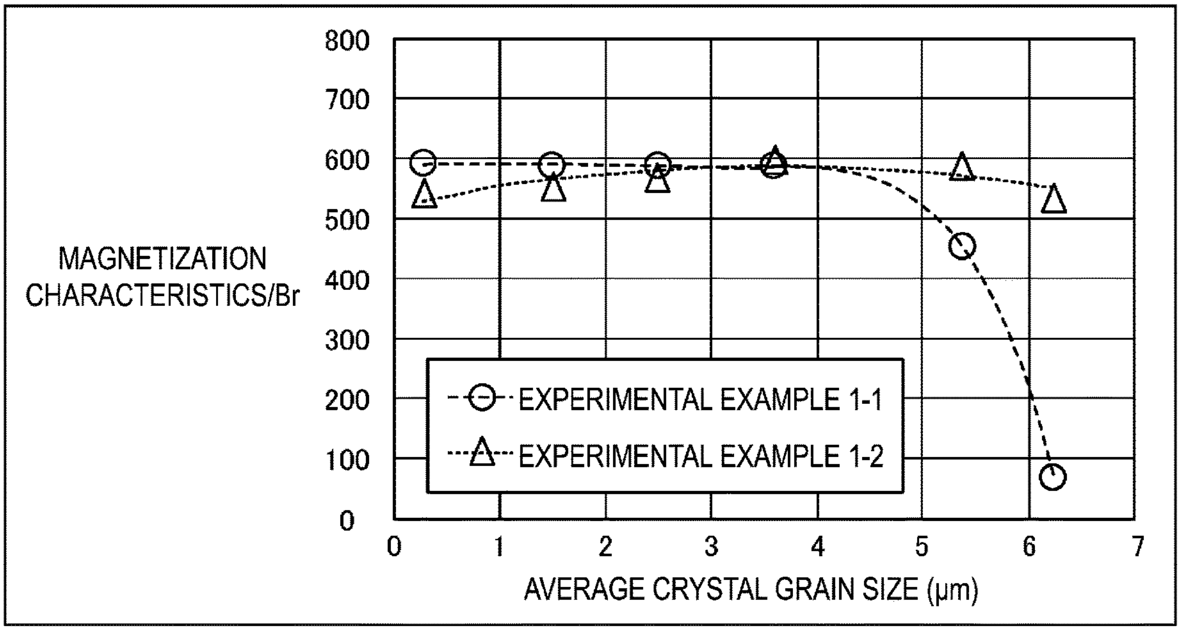
FIG. 19 is a graph illustrating the calculated value of the magnetization index with respect to the average crystal grain size when the pole pitch is 3.1 mm.

In the manufacturing methods of the first and second embodiments, the case where the to-be-magnetized object 100 is magnetized in the axial direction has been described, but the disclosure is not limited to this, and the to-be-magnetized object may be magnetized in the radial direction. FIG. 11 is a view illustrating a schematic configuration example of a magnetizer used in the second modification. FIG. 12 is a perspective view illustrating a field magnet unit of the magnetizer used in the second modification.

The magnetizer 1 used in the second modification is different from the magnetizer 1 used in the first and second embodiments in that a field magnet unit 9 magnetizes the to-be-magnetized object 100 in the radial direction. Another difference is that the preheating unit 5 directly preheats the to-be-magnetized object 100 instead of indirectly preheating the to-be-magnetized object via the field magnet unit 9. Note that the basic configuration of the magnetizer 1 used in the second modification is the same as the basic configuration of the magnetizer 1 used in the first and second embodiments, and therefore the configurations denoted by the same reference numerals will be omitted or simplified in the description.

A heating unit 4 includes a main body part 41 and a protruding part 42. The main body part 41 is formed in a disc shape, and among both surfaces in the vertical direction, the upper side surface is fixed to a heating unit mounting base 33 of a movement unit 3, and the protruding part 42 is formed to protrude downward from the lower side surface. The lower side surface of the protruding part 42 in the vertical direction is a heating surface 4*a*. The heating surface 4*a* has a diameter smaller than the diameter of an insertion hole 9*b* of a field magnet unit 9.

The upper side surface of a preheating unit 5 is a placement and heating surface 5*a*, and is formed in two stages. The to-be-magnetized object 100 is placed and heated at the first stage at the upper side of the placement and heating surface 5*a*, and the field magnet unit 9 is placed and heated at the second stage at the lower side.

The field magnet unit 9 generates a magnetic field for the to-be-magnetized object 100. The field magnet unit 9 in the second modification magnetizes the to-be-magnetized object 100 in the radial direction, and includes a main body part 91, a flange part 92, and permanent magnets 93. The main body part 91 is made of a non-magnetic metal material in a cylindrical shape, the lower side surface of both surfaces in the vertical direction is fixed to the second stage of the placement and heating surface 5*a* of the preheating unit 5, and an upper side surface 9*a* faces a ceiling plate 31 in the axial direction. An insertion hole 9*b* for inserting the to-be-magnetized object 100 is formed in the main body part 91. The flange part 92 is formed to protrude radially outward from the lower end part of the main body part 91. The flange part 92 fixes the field magnet unit 9 to the preheating unit 5 by inserting a fixing tool, for example, a fastening screw, into a through hole not illustrated, and the fixing tool is fixed to the preheating unit 5 with the field magnet unit 9 placed at the second stage of the placement and heating surface 5*a* of the preheating unit 5. The permanent magnets 93 are embedded on the insertion hole 9*b* side of the main body part 91 in the radial direction, generate a magnetic field with respect to the to-be-magnetized object 100, and are, for example, rectangular Sm—Co magnets. When viewed in the vertical direction, a plurality of the permanent magnets 93 are formed concentrically around the center of the main body part 91, and are arranged at equal intervals in the circumferential direction. Each of the permanent magnets 93 has two magnetic poles (an S pole and an N pole) at the radially inner and radially outer sides and is embedded in the main body part 91 having the different magnetic poles alternating in the circumferential direction. Here, the magnetic pole (for example, the S pole) at the radially inner side of the permanent magnet 93 is different from the magnetic pole (for example, the N pole) at the radially inner side of the permanent magnet 93 adjacent in the circumferential direction, and the magnetic pole (for example, the N pole) at the radially outer side is different from the magnetic pole (for example, the S pole) at the radially outer side of the permanent magnet 93 adjacent in the circumferential direction. Further, although being embedded in the main body part 91 while being exposed at the insertion hole 9*b*, the permanent magnets 93 may be embedded inside the main body part 91 without being exposed at the insertion hole 9*b*.

Next, a magnetization step performed by the magnetizer 1 according to the second modification will be described. The same parts as those of the magnetization step by the magnetizer 1 in the first and second embodiments will be omitted or simplified in the following description. First, the control unit 10 starts heating of the heating unit 4 and the preheating unit 5. Next, with the to-be-magnetized object 100 and the insertion hole 9*b* of the field magnet unit 9 opposing each other in the axial direction, an operator moves the to-be-magnetized object 100 downward, inserts the to-be-magnetized object 100 into the insertion hole 9*b* of the field magnet unit 9, and places the to-be-magnetized object 100 at the first stage of the placement and heating surface 5*a* of the preheating unit 5. At this time, the operator performs positioning of the to-be-magnetized object 100 with respect to the magnetizer 1 by inserting the to-be-magnetized object 100 into the insertion hole 9*b*. Further, the outer circumferential surface 100*d* of the to-be-magnetized object 100 faces the field magnet unit 9 in the radial direction, and the upper side surface 100*b* faces the heating surface 4*a* of the heating unit 4 in the axial direction.

Next, after the to-be-magnetized object 100 has been placed at the placement and heating surface 5*a* and a first predetermined time T1 has elapsed, the control unit 10 causes the movement unit 3 to move the heating unit 4 from the non-heating position to the heating position with respect to the to-be-magnetized object 100 to start heating of the preheated to-be-magnetized object 100, and after a second predetermined time T2 has elapsed from the start of heating of the to-be-magnetized object 100 at the heating position, the movement unit 3 is caused to move the heating unit 4 from the heating position to the non-heating position with respect to the to-be-magnetized object 100. The control unit 10 causes the cooling unit 8 to cool the to-be-magnetized object 100 at the non-heating position, and causes the cooling unit 8 to stop cooling at the non-heating position after a third predetermined time T3 has elapsed since the cooling unit 8 started cooling. Next, the operator takes out the magnetized object 100'.

As described above, in the manufacturing method according to the second modification, the temperature of the to-be-magnetized object 100 is increased from a temperature lower than the Curie point to a temperature equal to or higher than the Curie point (and lower than the Curie point of the permanent magnets for magnetization) and is decreased from the Curie point to a temperature lower than the Curie point while the magnetization magnetic field is being applied by the field magnet unit 9. This magnetizes the to-be-magnetized object 100 and manufactures the magnetized object (permanent magnet) from the to-be-magnetized object 100. The magnetized object is magnetized at regions corresponding to the permanent magnets 93 of the field magnet unit 9. The magnetized object of the second modification is a permanent magnet having a magnetization region corresponding to each of the permanent magnets 93, that is, one row of at least the outer circumferential surface 100*d* is multi-pole magnetized.

According to the manufacturing method of the second modification, as in the first and second embodiments, a permanent magnet having high magnetization characteristics can be obtained even by multipolar magnetization on a rare earth iron-based magnet having magnetic anisotropy. To be specific, when the same to-be-magnetized object as in the first embodiment is used, the pole pitch of the obtained magnetized object is 0.3 mm or more and 2.6 mm or less, and preferably 0.5 mm or more and 2.6 mm or less. In this case, in the field magnet unit, the permanent magnets for magnetization are arranged having the pole pitch of the to-be-magnetized object after the magnetization step falling within the above range. Alternatively, when the same to-be-magnetized object as in the second embodiment is used, the pole pitch of the obtained magnetized object is 0.3 mm or more and 3.1 mm or less, and preferably 0.5 mm or more and 3.1 mm or less. Also in this case, in the field magnet unit, the permanent magnets for magnetization are arranged having the pole pitch of the to-be-magnetized object after the magnetization step falling within the above range. Here, the pole pitch in the ring-shaped magnetized object is the arc length between adjacent poles in the circumferential direction of the upper side surface 100*b*.

Further, although the heating unit 4 reaches the heating temperature before reaching the heating position in the above-described embodiment and modification examples, the heating unit 4 is not limited to the aforementioned, and the heating unit 4 may be heated to a standby temperature lower than the heating temperature at the non-heating position, and the temperature may be increased from the standby temperature to the heating temperature at the heating position while the heating surface 4*a* is in contact with the to-be-magnetized object 100.

In the above-described embodiments and modifications, the to-be-magnetized object has a ring shape, but is not limited to this, and may have a rod shape. In this case, a rod-shaped magnetized object can be obtained by making the shape of the field magnet unit of the magnetizer rod-shaped.

EXAMPLES

Calculation Model

As a calculation model, multipolar magnetization from the outer periphery of ring magnets having outer diameters Φ 10 mm/inner diameters Φ 1.0 mm (thickness: 4.5 mm) was assumed.

As illustrated in Table 1, the pole pitch (0.5 mm to 3.1 mm) was determined by setting the number of magnetized poles (60 poles to 10 poles).

TABLE 1

| Table 1 | | | | | | | |
|---|---|---|---|---|---|---|---|
| Pole number | 60 | 40 | 30 | 20 | 16 | 12 | 10 |
| Pole pitch (mm) | 0.5 | 0.8 | 1.0 | 1.6 | 2.0 | 2.6 | 3.1 |

For each of them, a magnetization index represented by the following formula was calculated.

$$\text{Magnetization index } [-] = \text{maximum value of surface magnetic flux at each magnetization pitch } [mT]/\text{residual magnetic polarization of magnetized magnet } Jr\,[T]$$

It can be said that the larger the value of the magnetization index calculated by the above formula, the more excellent the magnetization characteristics.

In addition, correction was performed using the actually measured magnetization rate for each material of the to-be-magnetized object.

Experimental Example 1-1

In Experimental Example 1-1, the magnetization index was calculated for the case of the manufacturing method for a permanent magnet described in the first embodiment.

Specifically, the magnetization index was calculated for the following cases.

Magnetizer: the magnetizer illustrated in FIG. 1. However, it is assumed that the permanent magnets 63 in FIG. 2 are not arranged in the field magnet unit, and only the permanent magnets 64 are arranged.

Permanent magnets for magnetization: samarium cobalt magnets (SmCo magnets).

Magnetization condition: it is assumed that the magnetization magnetic field is applied while the temperature is increased to 330° C. (temperature of the Curie point +15° C.) and lowered to 150° C. (temperature lower than the Curie point −50° C.).

To-be-magnetized object: it is assumed that the to-be-magnetized object includes an anisotropic rare earth iron-based magnet (Nd—Fe—B-based magnets) having average crystal grain sizes of 0.29 μm, 1.50 μm, 2.50 μm, 3.59 μm, 5.37 μm, and 6.23 μm.

Experimental Example 1-2

In Experimental Example 1-2, the magnetization index was calculated for the case of a conventional manufacturing method for a permanent magnet by pulse magnetization.

Magnetization jig: the dimension of the magnetization jig required for calculation is set to an empirically appropriate value.

Magnetization condition: As a general production condition (maximum value), a current density 16 kA/mm$^2$ was set.

To-be-magnetized object: it is assumed that the to-be-magnetized object includes an anisotropic rare earth iron-based magnet (Nd—Fe—B-based magnets) having average crystal grain sizes of 0.29 μm, 1.50 μm, 2.50 μm, 3.59 μm, 5.37 μm, and 6.23 μm.

For Experimental Examples 1-1 and 1-2, the values of the calculated magnetization index with respect to the average crystal grain size were summarized for each pole pitch. That is, FIGS. 13 to 19 are views illustrating the calculated values of the magnetization index with respect to the average crystal grain size when the pole pitches are 0.5 mm, 0.8 mm, 1.0 mm, 1.6 mm, 2.0 mm, 2.6 mm, and 3.1 mm.

From these figures, it can be seen that in the manufacturing method for a permanent magnet using the magnetizer illustrated in FIG. 1, particularly excellent magnetization characteristics are exhibited when the following conditions 1 and 2 are satisfied, as compared with the conventional manufacturing method for a permanent magnet by pulse magnetization.

Condition 1 "the permanent magnets for magnetization of the field magnet unit are arranged having the pole pitch in the to-be-magnetized object after the magnetization step of 0.3 mm or more and 2.6 mm or less, and preferably 0.5 mm or more and 2.6 mm or less".

Condition 2: "the to-be-magnetized object is an anisotropic rare earth iron-based magnet having an average crystal grain size of 0.02 μm or more and 3.59 μm or less, preferably 0.29 μm or more and less than 3.59 μm".

Experimental Example 2-1

In Experimental Example 2-1, the magnetization index was calculated for the case of the manufacturing method for a permanent magnet described in the second embodiment.

Specifically, the magnetization index was calculated for the following cases.

Magnetizer: the magnetizer illustrated in FIG. 1. However, it is assumed that the permanent magnets 63 in FIG. 2 are not arranged in the field magnet unit, and only the permanent magnets 64 are arranged.

Permanent magnets for magnetization: samarium cobalt magnets (SmCo magnets).

Magnetization condition: it is assumed that the magnetization magnetic field is applied while the temperature is increased to 330° C. (temperature of the Curie point +15° C.) and lowered to 150° C. (temperature lower than the Curie point −50° C.).

To-be-magnetized object: it is assumed that the to-be-magnetized object includes an anisotropic rare earth iron-based magnet (Nd—Fe—B-based magnet) of a hot-worked magnet (average crystal grain size of 0.29 μm).

Experimental Example 2-2

In Experimental Example 2-2, the magnetization index was calculated for the case of the conventional manufacturing method for a permanent magnet by pulse magnetization.

Magnetization jig: the dimension of the magnetization jig required for calculation is set to an empirically appropriate value.

Magnetization condition: As a general production condition (maximum value), a current density 16 kA/mm$^2$ was set.

To-be-magnetized object: it is assumed that the to-be-magnetized object includes an anisotropic rare earth iron-based magnet (Nd—Fe—B-based magnet) of a hot-worked magnet (average crystal grain size of 0.29 μm).

Figure 20:
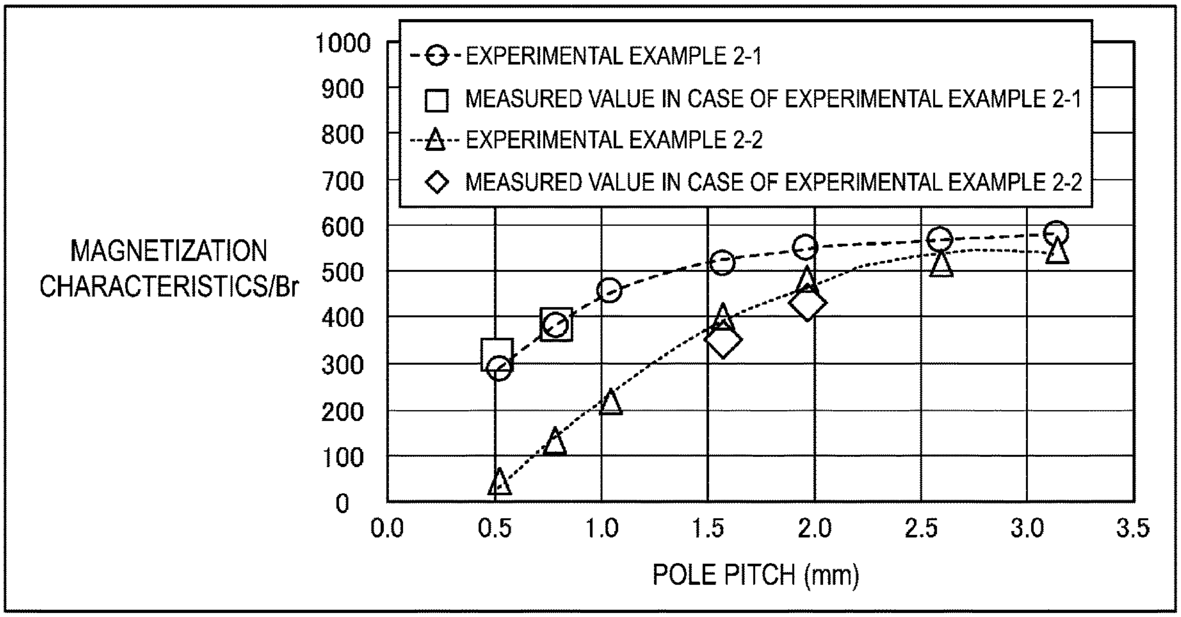
FIG. 20 is a view illustrating the calculated value of the magnetization index with respect to the pole pitch.

For Experimental Examples 2-1 and 2-2, the values of the calculated magnetization index with respect to the pole pitch are summarized. That is, FIG. 20 is a view illustrating the calculated value of the magnetization index with respect to the pole pitch.

From this figure, it can be seen that in the manufacturing method for a permanent magnet using the magnetizer illustrated in FIG. 1, particularly excellent magnetization characteristics are exhibited when the following conditions 1 and 2 are satisfied, as compared with the conventional manufacturing method for a permanent magnet by pulse magnetization.

Condition 1 "The permanent magnets for magnetization of the field magnet unit are arranged having the pole pitch in the to-be-magnetized object after the magnetization step of 0.3 mm or more and 3.1 mm or less, and preferably 0.5 mm or more and 3.1 mm or less".

Condition 2: "The to-be-magnetized object is an anisotropic rare earth iron-based magnet obtained by hot working".

In FIG. 20, the measured values are also illustrated. To be specific, the measured values at the pole pitches of 0.5 mm and 0.8 mm are also illustrated for the Experimental Example 2-1, and the measured values at the pole pitches of 1.6 mm and 2.0 mm are also illustrated for the Experimental Example 2-2. It can be seen that the calculated value obtained by the calculation model illustrates a high correlation with the measured value.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. A manufacturing method for a permanent magnet, comprising a magnetization step of magnetizing a to-be-magnetized object by a magnetizer including a field magnet unit with a plurality of permanent magnets for magnetization configured to generate a magnetic field on the to-be-magnetized object arranged at equal intervals and a heating unit having a heating surface opposing the to-be-magnetized object in an axial direction of the to-be-magnetized object and configured to heat the to-be-magnetized object, wherein in the magnetization step, the to-be-magnetized object is disposed on the field magnet unit, the to-be-magnetized object is heated by the heating unit to increase a temperature equal to or higher than a Curie point of the to-be-magnetized object and lower than the Curie point of the permanent magnets for magnetization and then lower the temperature to a temperature lower than the Curie point of the to-be-magnetized object, and a magnetization magnetic field is applied to the to-be-magnetized object by the permanent magnets for magnetization, the to-be-magnetized object is an anisotropic rare earth iron-based magnet having an average crystal grain size of 0.02 μm or more and 3.59 μm or less, and in the field magnet unit, the permanent magnets for magnetization are arranged having a pole pitch in the to-be-magnetized object after the magnetization step of 0.3 mm or more and 2.6 mm or less.

2. A manufacturing method for a permanent magnet comprising a magnetization step of magnetizing a to-be-magnetized object by a magnetizer including a field magnet unit with a plurality of permanent magnets for magnetization configured to generate a magnetic field on the to-be-magnetized object arranged at equal intervals and a heating unit having a heating surface opposing the to-be-magnetized object in an axial direction of the to-be-magnetized object and configured to heat the to-be-magnetized object, wherein in the magnetization step, the to-be-magnetized object is disposed on the field magnet unit, the to-be-magnetized object is heated by the heating unit to a temperature equal to or higher than a Curie point of the to-be-magnetized object and lower than the Curie point of the permanent magnets for magnetization, and then the temperature is lowered to a temperature lower than the Curie point of the to-be-magnetized object, and a magnetization magnetic field is applied to the to-be-magnetized object by the permanent magnets for magnetization, the to-be-magnetized object is an anisotropic rare earth iron-based magnet obtained by hot working, and in the field magnet unit, the permanent magnets for magnetization are arranged having a pole pitch in the to-be-magnetized object after the magnetization step of 0.3 mm or more and 3.1 mm or less.

* * * * *